United States Patent
Wang et al.

(10) Patent No.: US 12,522,840 B2
(45) Date of Patent: Jan. 13, 2026

(54) R GENE FOR CONTROLLING MATCHING OF SOYBEAN-RHIZOBIUM, PROTEIN AND USE THEREOF

(71) Applicants: HENAN UNIVERSITY, Kaifeng (CN); HUAZHONG AGRICULTURAL UNIVERSITY, Wuhan (CN)

(72) Inventors: Xuelu Wang, Kaifeng (CN); Bao Zhang, Kaifeng (CN); Youguo Li, Wuhan (CN)

( * ) Notice: Subject to any disclaimer, the term of this patent is extended or adjusted under 35 U.S.C. 154(b) by 202 days.

(21) Appl. No.: 18/004,060

(22) PCT Filed: Dec. 16, 2021

(86) PCT No.: PCT/CN2021/138591
§ 371 (c)(1),
(2) Date: Dec. 31, 2022

(87) PCT Pub. No.: WO2022/135246
PCT Pub. Date: Jun. 30, 2022

(65) Prior Publication Data
US 2024/0182918 A1    Jun. 6, 2024

(30) Foreign Application Priority Data
Dec. 23, 2020   (CN) .......................... 202011537197.4

(51) Int. Cl.
*C12N 15/82* (2006.01)
*C07K 14/415* (2006.01)

(52) U.S. Cl.
CPC ........ *C12N 15/8261* (2013.01); *C07K 14/415* (2013.01)

(58) Field of Classification Search
None
See application file for complete search history.

(56) References Cited

PUBLICATIONS

Li, Rong et al., Research status of soybean symbiosis nitrogen fixation, Mar. 2020, Oil Crop Science, vol. 5(1), pp. 6-10 (Year: 2020).*
Predicted: Glycine soja TMV resistance protein N-like (LOC114383909), mRNA, NCBI Reference Sequence: XM_028343616.1, Mar. 12, 2019 (Year: 2019).*
Predicted: Glycine soja TMV resistance protein N-like (LOC114383909), mRNA, NCBI Reference Sequence: XM_028343616.1, Mar. 12, 2019 Sequence Alignment (Year: 2019).*
Yang et al., R gene-controlled host specificity in the legume-rhizobia symbiosis, 2010, PNAS, vol. 107(43), pp. 18735-18740 (Year: 2010).*
Sugawara et al., Symbiotic incompatibility between soybean and Bradyrhizobium arises from one amino acid determinant in soybean Rj2 protein, 2019, PLOS ONE, vol. 14(9), pp. 1-16 (Year: 2019).*
Glyma16g33780 alignment; run on Jan. 23, 2025 (Year: 2025).*
Mao et al., Inheritance and mapping for resistant genes of soybean adult-plant and seed coat mottling to soybean mosaic virus №3 strain, 2014, Australian Journal of Crop Science, vol. 8(5), pp. 806-813 (Year: 2014).*

* cited by examiner

*Primary Examiner* — Amjad Abraham
*Assistant Examiner* — Christina L Meadows
(74) *Attorney, Agent, or Firm* — Novoclaims Patent Services LLC; Mei Lin Wong

(57) ABSTRACT

A R gene is arranged for controlling soybean-rhizobia compatibility, wherein the GmNNL1 gene of the gene sequence in Hengfeng black bean of the soybean products is shown in SEQ ID NO. 2, and the encoded amino acid sequence is shown in SEQ ID NO. 3. The soybean R gene GmNNL1 is an effective gene that is able to regulate the nodule number of specific rhizobia on soybean, and to regulate the nodule number by directly recognizing the haplotype of the bradyrhizobia-specific effector protein NopP, which is able to limit the symbiotic nodulation of indigenous rhizobia, make soybean preferentially nodule with artificially applied high-efficiency rhizobia agents, and improve symbiotic nitrogen fixation capacity.

1 Claim, 7 Drawing Sheets

Specification includes a Sequence Listing.

R GENE FOR CONTROLLING MATCHING OF SOYBEAN-RHIZOBIUM, PROTEIN AND USE THEREOF

FIELD OF INVENTION

The present invention relates to a technical field of biotechnology for an application of new genes, and more particularly to an R gene for controlling soybean-rhizobia compatibility and its protein thereof and application.

DESCRIPTION OF RELATED ARTS

Soybean cultivation [*Glycine max* (L.) Merr] is originated in China and is one of the important foods, feeds, oils and energy crops in the world. It is one of the traditional "grains" and an essential component of people's daily diet (Palander et al., 2005). Meanwhile, with the development of our country economy and the sharp increase of the population's demand for food, our country has used a large number of chemical fertilizers in food production, of which nitrogen fertilizer is the most common chemical fertilizer. According to the statistics of the World Food and Agriculture Organization (FAO), the annual usage of nitrogen fertilizer in our country continuously increases from 2002 to 2014. Although our country's cultivated land area only accounts for 8% of the world, the use of nitrogen fertilizer has reached 35% of the world's total use (http://faostat.fao.org/). Excessive application of nitrogen fertilizers and nutrient loss lead to serious water eutrophication and environmental pollution. Meanwhile, it also affects the composition of soil organic matter, reduces biological activity, and leads to soil compaction. Nitrogen fixation microorganisms can use their own synthetic nitrogenase to reduce nitrogen in the atmosphere to ammonia that can be directly used by plants, that is, biological nitrogen fixation. The symbiotic nitrogen fixation of soybean and rhizobia not only reduces energy consumption (industrial nitrogen fertilizer production consumes more energy) but also improves soil quality, which is the better choice for the of the N supply in agricultural production. In the global ecosystem, the nitrogen fixation by legumes through symbiotic nitrogen fixation accounts for 60%-70% of the biological nitrogen fixation. In the agricultural system, soybean occupies 86% of the symbiotic nitrogen fixation of beans, and the annual nitrogen yield reaches 16.44 million tons (Herridge 2008). Therefore, the symbiotic nitrogen fixation system established by soybean and rhizobia has the great significance to agricultural production and the development of green and sustainable agriculture.

The compatibility is existent between soybean and rhizobia. There are great differences in the nodulation and nitrogen fixation characteristics of the same rhizobia on different soybean lines, or different rhizobia on the same soybean line. The leguminous plant-rhizobia combination with high compatibility and strong symbiotic nitrogen fixation ability can provide excellent effect of symbiotic nitrogen fixation. Rhizobia with broad-host-rang compatibility can be easily utilized in agricultural production. For example, although the bradysoybean rhizobia USDA110 is a well-recognized high-efficiency and broad-spectrum rhizobia, and provide a better nodulate nitrogen fixation in some soybean lines, but it still only has a low symbiotic nitrogen-fixing ability in some soybean lines. The distribution of rhizobia in our country has obvious geographical distribution characteristics. Different types of rhizobia are distributed in different regions of our country. Tian et al. found that the bradyrhizobia accounted for 100% and 99.6% in Northeast China and South China. The bradyrhizobia accounted for 30% and Sinorhizobia 70% in the Huanghuaihai region with alkaline soil. The bradyrhizobia and Sinorhizobia each account for about 50% in the semi-arid alkaline soil area of Xinjiang (Tian et al., 2012). Studies have shown that the inoculation of *Rhizobium* can significantly improve the symbiotic nitrogen fixation ability of legume crops, promote root growth and increase crop yield (Ferreira et al., 2009). In major soybean-producing countries such as the United States and Brazil, inoculation of the compatible rhizobia to soybean has been widely promoted and applied as one of the important measures to decreasing fertilizer and increase soybean production (Mendes et al., 2003; Sogut 2006; de Freitas et al., 2012). Although the area inoculated with rhizobia in China is relatively small, we still achieved good benefits therefrom (Tang et al. 2011). Hailong City, Heilongjiang in China took the lead in inoculating 80% of rhizobia in soybean cultivating areas, increasing the yield per mu by more than 10%. However, the total area of soybean inoculated with rhizobia in China has decreased in the past ten years. The inoculated area of rhizobia is less than 3% of the soybean cultivating area, which is far from the international level. An important reason is that the nodulation ability of rhizobia agents in the field is weaker than that of indigenous rhizobia. Soybean originated in China, and the soil in the main soybean cultivating area generally has a large number of adaptability and strong nodulation ability. Since the indigenous rhizobia has low nitrogen-fixing ability (Wu, et al 2017; Sun et al., 2004), it affected the nodulation and efficacy of rhizobia agents. Therefore, limiting the nodulation of indigenous rhizobia in soybean is important for the efficacy of the inoculated high-efficiency rhizobia agents. However, research and technical inventions on how to restrict indigenous rhizobia to nodulate soybeans and then let the high-efficiency rhizobia agents preferentially nodulate the soybeans have not been reported.

SUMMARY OF THE PRESENT INVENTION

The present invention provides an R gene for controlling soybean-rhizobium symbiotic compatibility, and its protein thereof and application to solve the regulation of soybean and rhizobium symbiotic compatibility, and to provide a solution of how to use soybean and rhizobium symbiotic compatibility to improve soybean nitrogen fixation ability, so as to improve the nitrogen utilization rate of soybean.

The technical solution of the present invention is realized as follows: an R gene for controlling soybean-rhizobia compatibility, wherein the gene sequence of R gene is shown in SEQ ID NO.2 or the modified nucleotide sequence of SEQ ID NO.2. Further, the modification includes insertion of a transposon, deletion or addition of bases, or CRISPR-Cas9 modification. The sequence of the R gene can also be shown in SEQ ID NO.4, SEQ ID NO.5, SEQ ID NO.6, SEQ ID NO.7 or SEQ ID NO.8.

For the functional marker primer pair GmSINE1-F/R used to identify the above mentioned R gene, the sequence of GmSINE1-F is shown in SEQ ID NO.9, and the sequence of GmSINE1-R is shown in SEQ ID NO.10. For the functional marker primer pair GmSINE1-F/R, the amplified band is 443 bp when used to amplify the R gene of SEQ ID NO.2, and the amplified band is 622 bp when used to amplify the R gene of whose sequence shown in SEQ ID NO. 4, SEQ ID NO. 5, SEQ ID NO. 6, SEQ ID NO. 7 or SEQ ID NO. 8.

The protein is encoded by the above mentioned R gene. Further, its amino acid sequence is shown in SEQ ID NO.3. The nucleotide sequence of the promoter of this gene is shown in SEQ ID NO.1.

The application of the above mentioned R gene or the protein encoded by the R gene is arranged for improving the soybean and soybean-rhizobia combination, weakening and limiting the nodulation of indigenous rhizobia on soybean, enhancing the compatibility of soybean and rhizobia inoculants, and enhancing symbiotic nitrogen fixation ability.

The application of the above mentioned R gene and its promoter is arranged for improving the symbiotic nitrogen fixation of legume crops. Further, its steps are: construct the RNAi carrier of the overexpression vector or the R gene that includes the sequence of R gene as shown in SEQ ID NO.2 and the sequence of the promoter as shown in SEQ ID NO.1, through *Agrobacterium*-mediated transformation, screen the transgenic positive plants for cultivation, inoculate with rhizobia agents, continue to cultivate and complete the application of enhancing the symbiotic nitrogen fixation ability of soybean.

The present invention has the following advantages.

1. The soybean R gene GmNNL1 of the present invention is obtained by the genome-wide association analysis of the symbiotic nitrogen fixation phenotype of cultivated soybean. Using genetic population verification and soybean hair root transient transformation system, stable transgenic plants and HR reaction identification experiments are successfully isolated, cloned and verified. The soybean R gene GmNNL1 is an effective gene that can regulate the nodule number of on soybean inoculated with specific rhizobia. It can regulate the nodule number by directly recognizing the haplotype of the bradyrhizobia-specific effector protein NopP, which can limit the nodulation of indigenous rhizobia, make soybean preferentially nodulate with artificially applied high-efficiency rhizobia agents, and improve symbiotic nitrogen fixation capacity. For any unclear of the fine regulation of soybean-rhizobium symbiotic compatibility by R gene and the molecular mechanism for increasing the above-ground biomass of crops, this gene participates and inhibit root hair infection and regulating nodulation, thereby affecting the biomass of above-ground parts.

2. The soybean with the $GmNNL1^{HT1}$ haplotype of the functional R gene of the present invention can limit the nodulation of the widely distributed bradyrhizobia with the $NopP^{USDA110/USDA6}$. However, it cannot limit the nodulation of other rhizobia. The $GmNNL1^{HT2-HT6}$ haplotype with a non-functional R gene (encoding an incomplete structure of the TIR-NBS-LRR protein) cannot restrict the nodulation of rhizobia with any NopP genotypes, thereon. The overexpression of GmNNL1 gene driven by the GmNNL1 gene promoter (SEQ ID. NO: 1 sequence) in soybean plants reduce the nodule number of soybean inoculated with specific rhizobia for easy to nodulate with the inoculated high-efficiency soybean rhizobia inoculum, which can improve the symbiotic nitrogen fixation ability of soybean. Alternatively, the functional GmNNL1 gene can be RNAi or knocked out, such that the transgenic soybean can nodulate with the indigenous rhizobia and improve the symbiotic nitrogen fixation ability (although the efficiency is low).

3. The broken of GmNNL1-NopP recognition relationship can increase the nodule number per plant, the nitrogenase activity and the fresh aboveground biomass per plant. This research will provide genetic resources for nitrogen-efficient molecular breeding of legumes and provide molecular modification technology for the utilization and application of legume-rhizobia, so as to provide the development of environment-friendly green and sustainable agriculture.

DETAILED DESCRIPTION OF THE PREFERRED EMBODIMENT

The present invention will be clearly and completely described below with reference to the accompanying drawings and embodiments. Obviously, the described embodiments are only some, but not all, embodiments of the present invention. Based on the embodiments of the present invention, all other embodiments obtained by those of ordinary skill in the art without creative efforts shall fall within the protection scope of the present invention.

Embodiment 1

Figure 1:
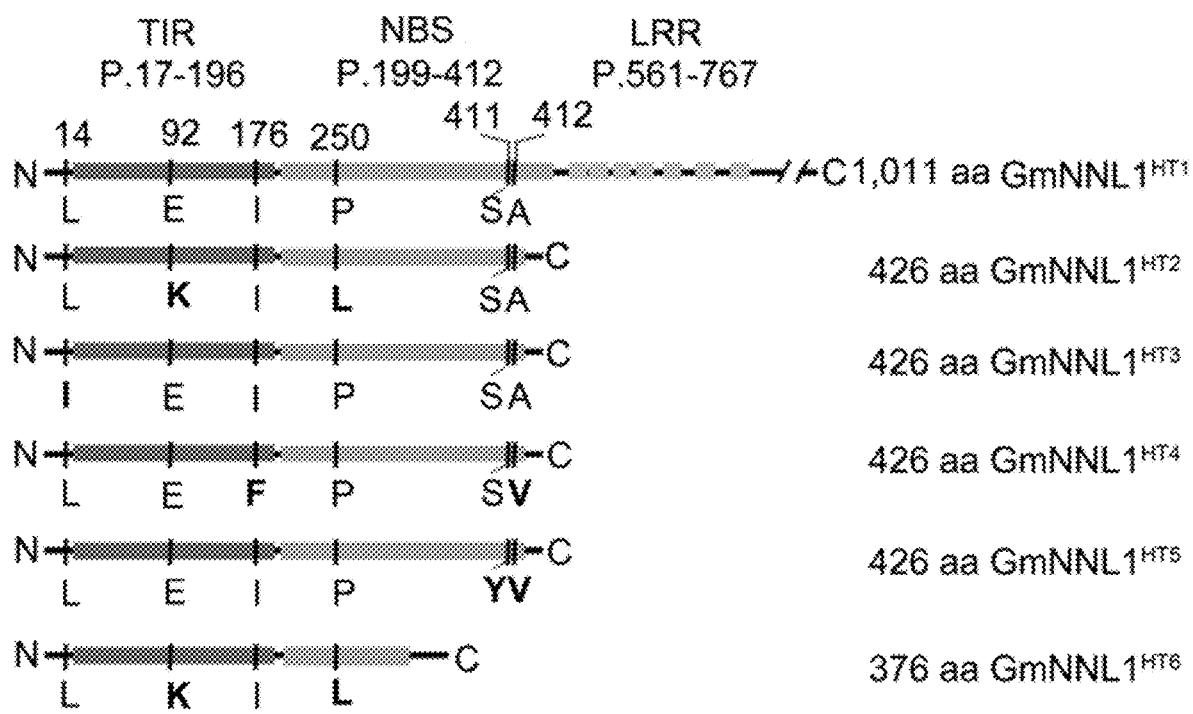
FIG. 1 is a schematic diagram of the protein structure of each soybean GmNNL1 haplotype.
Figure 2:
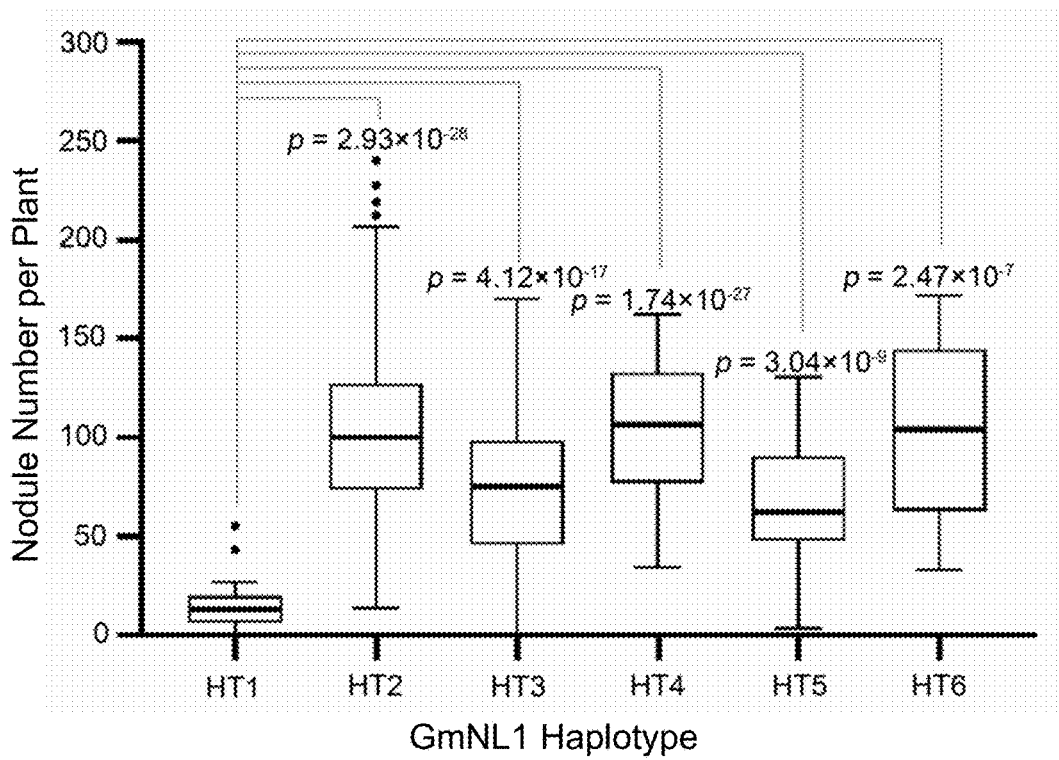
FIG. 2 illustrates a comparative analysis of the nodule number per plant of each soybean GmNNL1 haplotype.
Figure 3:
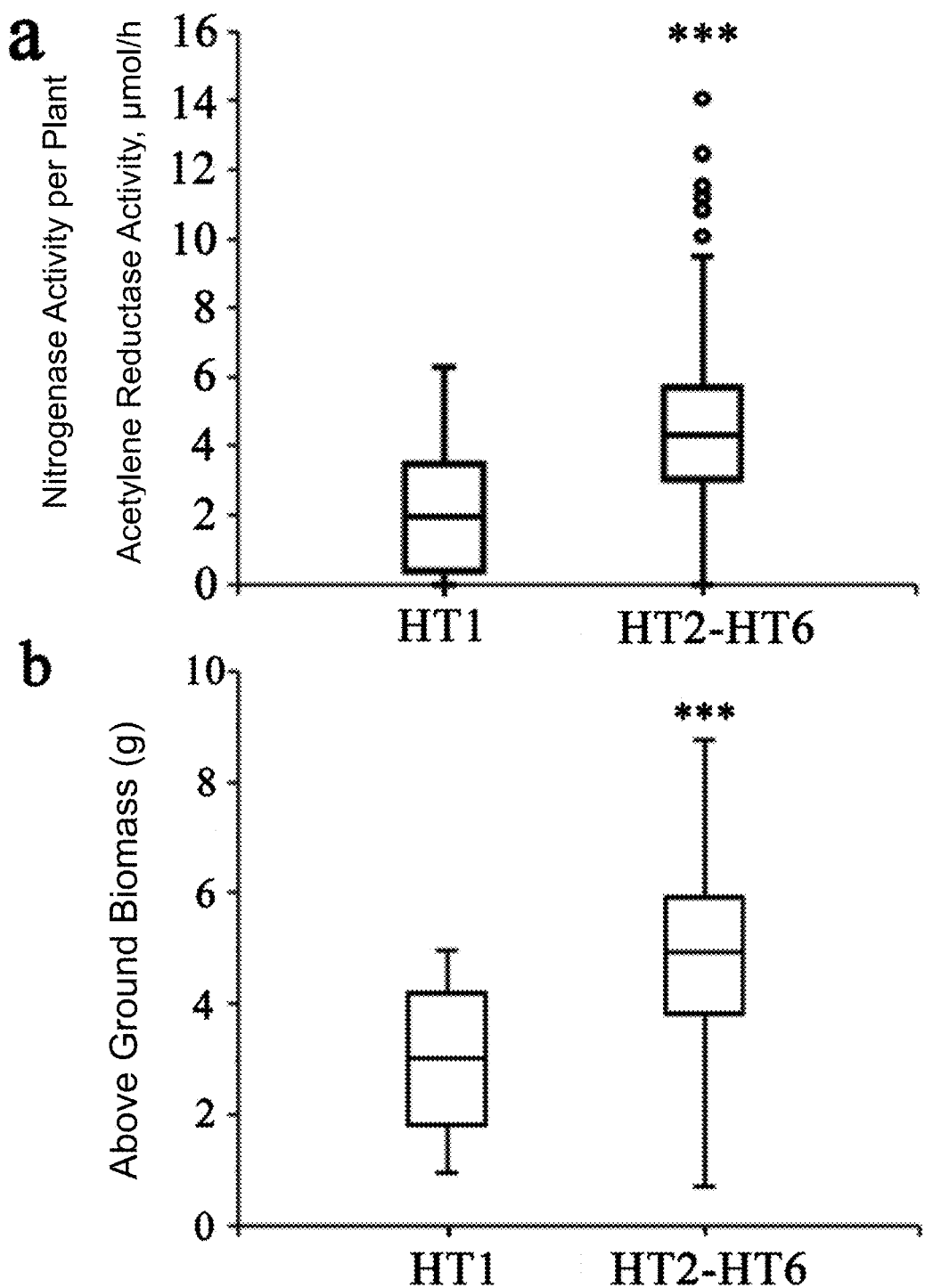
FIG. 3 illustrates a comparative analysis of the nitrogenase activity (a) and the fresh aboveground biomass per plant (b) of the $GmNNL1^{HT1}$ haplotype soybean product with respect to the $GmNNL1^{HT2-HT6}$ haplotype soybean product.

The main objective of the present invention is the core of soybean cultivation. Through genome-wide association analysis, an R gene in soybean, GmNNL1, that can simultaneously affect the number of soybean nodules, nitrogenase activity per plant and above-ground biomass was identified. Through haplotype analysis, it was found that among the 6 main haplotypes of GmNNL1, only $GmNNL1^{HT1}$ (sequence shown in SEQ ID No. 1) could normally encode a complete typical R protein of TIR-NBS-LRR. The other five haplotypes (sequences shown in SEQ ID NO.4, SEQ ID NO.5, SEQ ID NO.6, SEQ ID NO.7 or SEQ ID NO.8) are all caused by the insertion of a transposon GmSINE1 or deletion of a single base resulted in an incomplete protein form (FIG. 1). Through haplotype analysis, it is found that the number of root nodules in soybean with GmNNL1$^{HT1}$ haplotype is significantly lower than that of other haplotypes (FIG. 2). By comparing the complete form of GmNNL1$^{HT1}$ with the incomplete form of GmNNL1$^{HT2-HT6}$ of R protein, it is found that the nitrogenase activity per plant and the fresh weight of the aerial part of soybean with GmNNL1$^{HT1}$ haplotype are significantly lower than those of soybean with GmNNL1$^{HT2-HT6}$ haplotype (FIG. 3).

Figure 4:
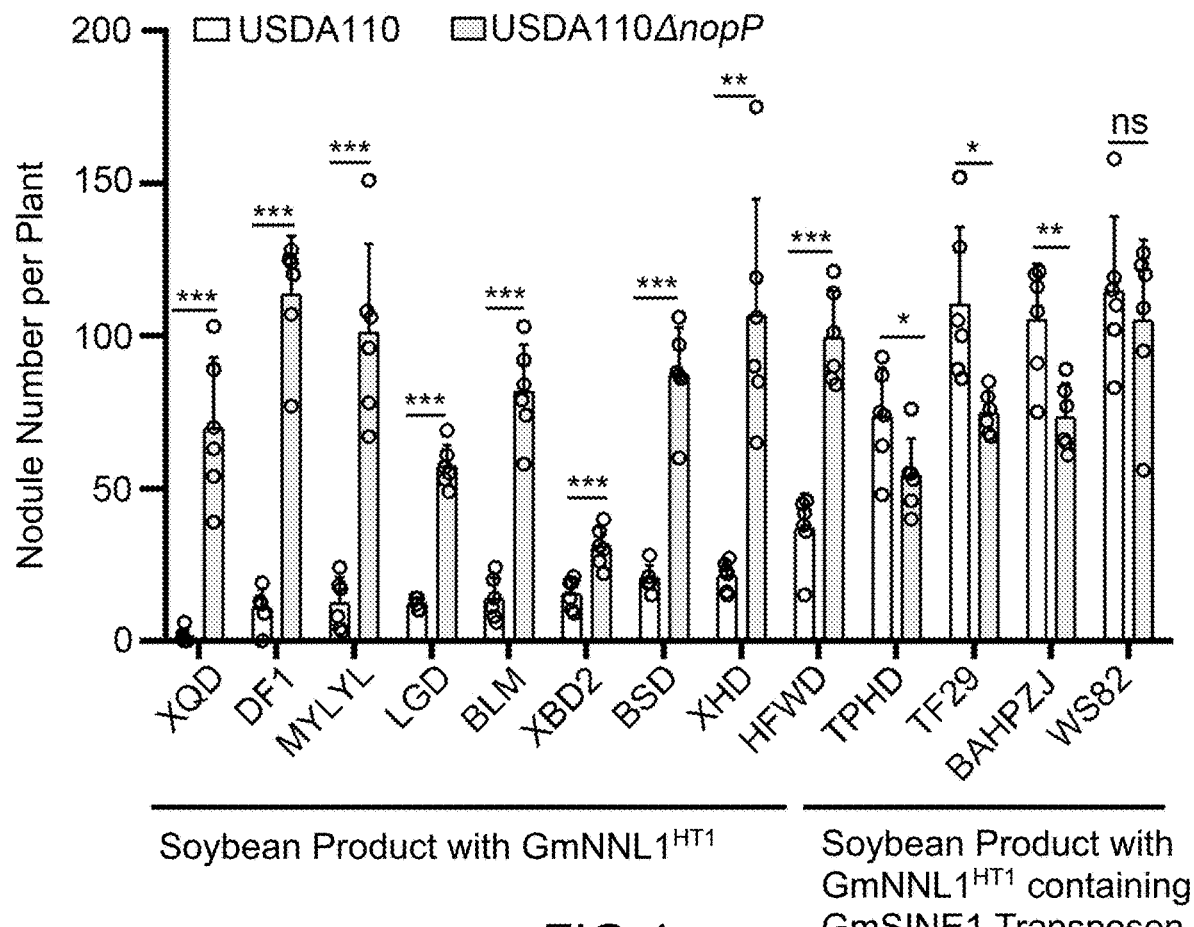
FIG. 4 illustrates the nodule number of several soybean accessions carrying $GmNNL1^{HT1}$ or GmNNL1 with a GmSINE1 insertion inoculated with USDA110 or the USDA110ΔnopP mutant.

In our study, we found that GmNNL1$^{HT1}$ recognizes the effector protein NopP in Rhizobia. Using USDA110 and its nopP gene mutant strain USDA110ΔnopP, soybean products with GmNNL1$^{HT1}$ and soybean products with GmNNL1 (with GmSINE1 transposon insertion) haplotype are inoculated respectively. It was found that USDA110ΔnopP is able to form more nodules on soybean products with GmNNL1$^{HT1}$ than inoculated with wild-type strain USDA110. However, the nodule number is reduced or not significantly changed on products with GmNNL1$^{HT2-HT6}$ (FIG. 4).

Figure 5:
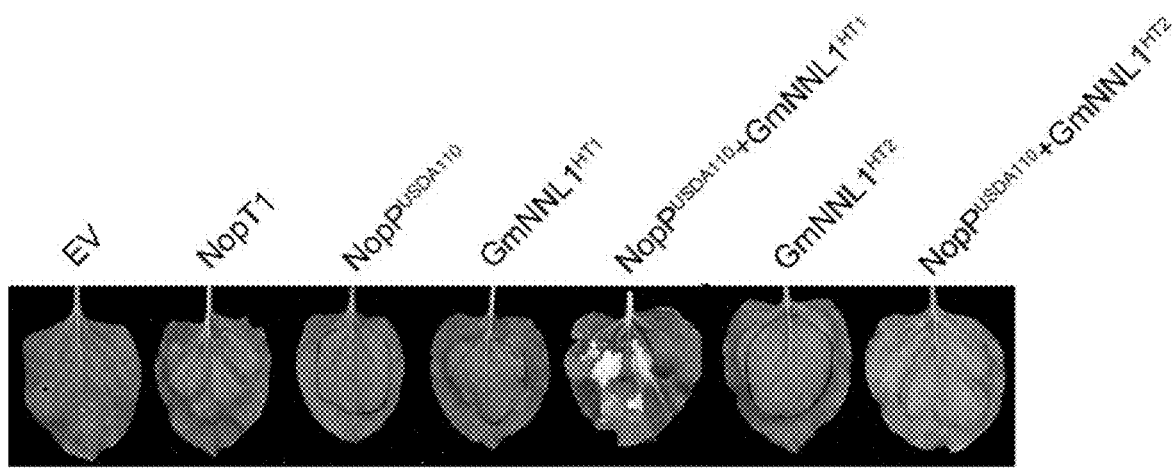
FIG. 5 illustrates that $GmNNL1^{HT1}$ can recognize Nop-$p^{USDA110}$ to induce HR response in tobacco leaves, but $GmNNL1^{HT2}$ cannot.

Transient injections of N. benthamiana are injected with NopP$^{USDA110}$, NopT1 (as a positive control, which has been reported to cause HR-like cell death in tobacco), GmNNL1$^{HT1}$, GmNNL1$^{HT2}$ alone, NopP$^{USDA110}$ and GmNNL1$^{HT1}$ co-transformed, and NopP$^{USDA110}$ and GmNNL1$^{HT2}$ co-transformed. Co-transfection of Nop-P$^{USDA110}$ with GmNNL1$^{HT1}$ is found to cause strong HR-like cell death in tobacco leaves after 7 days. However, the transformation of NopP$^{USDA110}$, GmNNL1$^{HT1}$, and GmNNL1$^{HT2}$ alone and the co-transformation of Nop-P$^{USDA110}$ and GmNNL1$^{HT2}$ do not cause strong cell death (FIG. 5), wherein it is indicated that GmNNL1$^{HT1}$ can recognize NopP$^{USDA110}$ and cause HR response.

The specific soybean-rhizobium symbiotic compatibility relationship as: Soybean with the GmNNL1HT1 haplotype of the functional R gene can limit the nodulation of the bradyrhizobia with the NopP$^{USDA110}$ haplotype on it, but it cannot limit the nodulation of the rhizobia on it. The GmNNL1$^{HT2-HT6}$ haplotype with a non-functional R gene (encoding an incomplete structure of the TIR-NBS-LRR protein) is not able to restrict rhizobia nodulation thereon. For the sequences such as 5 haplotypes shown in SEQ ID NO.4, SEQ ID NO.5, SEQ ID NO.6, SEQ ID NO.7 or SEQ ID NO.8, since the typical R protein cannot be encoded into a complete TIR-NBS-LRR, it cannot or is unable to fully exert the function of R protein.

Embodiment 2

The gene sequence of GmNNL1 is obtained using the following method.

The total volume of the reaction system is 50 μl, and the template is 1 μL (about 50 ng) of genomic DNA of soybean strain Hengfeng black beans, 5 μl of 10×KOD enzyme reaction buffer, 2 μl of 25 mM MgCL2, 5 μl of 5 mM dNTP, 5 μl of 5 uM primers (primers NNL1-F and NNL1-R, each primer is 2.5 μl), 1 μl of KOD enzyme. Add ddH2O (sterile deionized water) to 50 μl. The reaction process is: denaturation at 94° C. for 5 min, 94° C. for 30 sec, 55° C. for 1 min, 68° C. for 3.5 min for 35 cycles, and extension at 68° C. for 10 min. The primers are: NNL1-F: SEQ ID NO. 11: ATGGCACACAGAACAGCACCATCT; SEQ ID NO. 12: NNL1-R: TCATTTAACAACATAGTACAAAC. Finally, a gene sequence containing the nucleotides described in SEQ ID NO.2 is obtained, and the protein encoded by the gene is shown in SEQ ID NO.3.

The protection of the present invention not only includes the nucleotide sequence corresponding to the amino acid sequence shown in SEQ ID NO. 3, but also includes the modified protein with the same function of the sequence shown in SEQ ID NO. 3.

Embodiment 3

Figure 6:
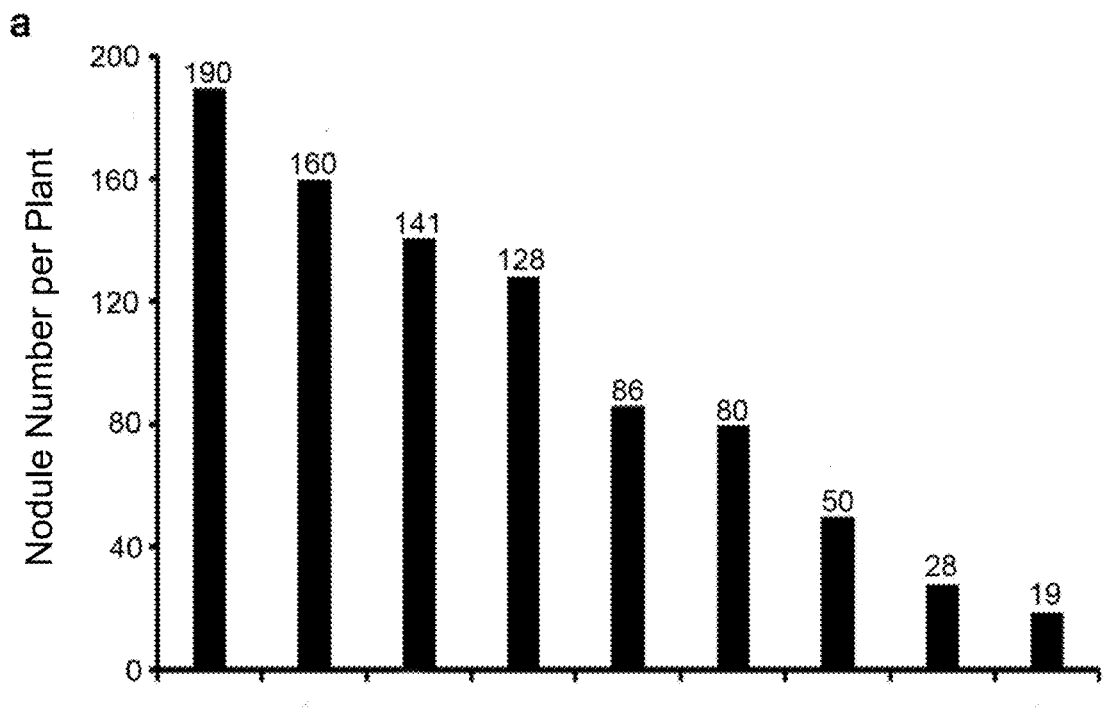
FIG. 6 is a chart illustrating an analysis of the nodule number (a) and the analysis of the expression (b) of the soybean pGmNNL1::GmNNL1 stable transgenic lines.
Figure 6:
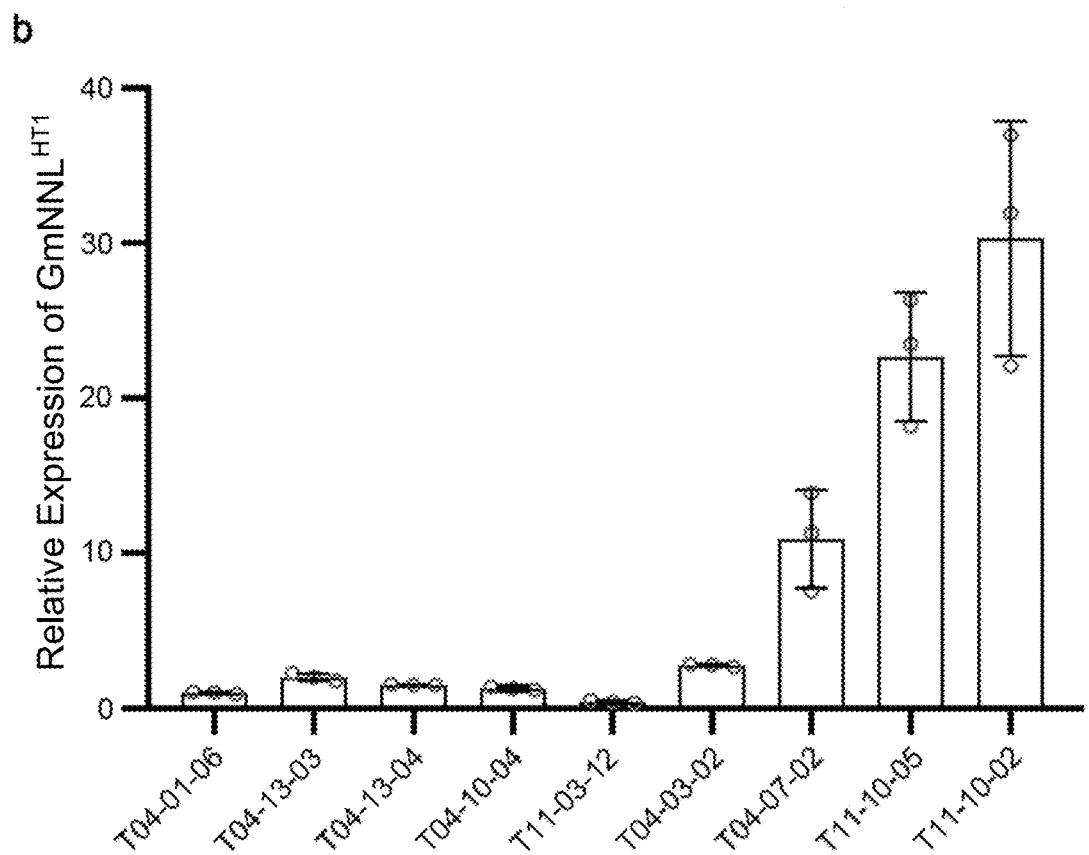

The application of GmNNL1 gene in regulating soybean-rhizobium symbiotic compatibility and thus affecting the nitrogen fixation efficiency of soybean symbiosis. The application process is as follows:

The promoter and full-length CDS of GmNNL1 cloned from HFWD are cloned into pUB-GFP and transferred into Williams82 (WS82, GmNNL1$^{HT2}$). After inoculation of USDA110 in the obtained transgenic lines, the higher the expression level of GmNNL1$^{HT1}$, the less the nodule number (FIG. 6). Therefore, the nodulation of specific species of rhizobia can be reduced by this method. The specific process is:

(1) the GmNNL1 Promoter Region is Obtained by the Following Method.

The total volume of the reaction system is 50 μl, and the template is 1 μl (about 50 ng) of Hengfeng black beans genomic DNA, 5 μl of 1×KOD enzyme reaction buffer, 2 μl of 25 mM MgCL2, 5 μl of 5 mM dNTP, and 5 μl of 5 uM primer (primers pNNL1-F and pNNL1-R are 2.5 μl respectively), 1 μl of KOD enzyme. Add ddH2O (sterile deionized water) to 50 μl. The reaction program is: denaturation at 94° C. for 5 min, 94° C. for 30 sec, 55° C. for 1 min, 68° C. for 2 min for 35 cycles, and extension at 68° C. for 10 min. The primers are as follows: pNNL1-F: SEQ ID NO. 13: TCGTTCCCTCTCATGTGTTCGA; pNNL1-R: SEQ ID NO. 14: GATTTAGGAACTTCAGAAAT. Finally, the promoter region containing GmNNL1 gene shown in SEQ.ID.No.1 is obtained.

(2) Construction of Plant Expression Vector pGmNNL1::GmNNL1

First, the promoter region and gene region of GmNNL1 are amplified from the Hengfeng black beans genome, and the fragment is connected to the pUB-GFP vector to obtain the plant expression vector pUB-pGmNNL1::GmNNL1, then transferred to Williams82 (WS82).

The primers used are as follows: NNL1-aF: SEQ ID NO. 15:

NNL1-aF:
SEQ ID NO. 15
CAGTGCCAAGCTGGGCTGCAGTCGTTCCCTCTCATGTGTTCGA;

NNL1-aR:
SEQ ID NO. 16
GTCCTTATAGTCCATGGTACCTTTAACAACATAGTACAAACAACT.

(3) Genetic Transformation of Soybean

According to the present invention, soybean transformation is carried out by Agrobacterium EHA105-mediated transformation of soybean cotyledon nodes, mainly referring to the previously reported transformation method (Luth et al 2015), and improvements are made on this basis.

1) Sterilization and Germination of Soybean Seeds

① Seed sterilization: Pick soybeans without damage and spots and sterilize them with chlorine gas (measure 100 ml of sodium hypochlorite into a 250 ml beaker, slowly add 5 ml of concentrated hydrochloric acid along the wall of the beaker, and seal and sterilize for 16 hours).

② Seed germination: Place the sterilized soybean seeds in the germination medium, and place them in a 22° C. incubator for 16-24 hours in the dark to germinate.

2) Activation of *Agrobacterium* and Preparation of Infection Solution

Take 250 μl of the frozen bacterial solution and spread it on the LB plate with the corresponding antibiotic, and culture it at 28° C. overnight. The bacterial membrane is scraped by a disposable inoculating loop, suspended in the liquid co-culture medium, and the concentration of the bacterial liquid is measured with a spectrophotometer to make the final concentration OD600-0.5-0.6.

3) Explant Preparation and Infection

Retain the hypocotyls with a length of 3-5 mm, separated the two cotyledons, remove the seed coats, and after the primary buds are excised, obtain the cotyledonary node explants for transformation by making several cuts at the cotyledonary node with a blade. Place it in the infection solution and oscillate on a horizontal rotator (rotation speed 50-80 r/min) to infect for 30 min.

4) Co-Culture

Pour off the bacterial liquid, transfer the explants to a solid co-culture medium covered with a layer of sterile filter paper, 15-20 per dish, and cultivate in a dark incubator at 22° C. for 3-5 days.

5) Screening Culture and Plant Regeneration

① Bud induction culture: After co-cultivation for 3 to 5 days, the explants are transferred to the bud induction medium, 5 explants are placed in each dish, and the photoperiod is 16/8 hours (light/dark), cultured at 25° C., subculture once every 2 weeks, and subculture twice.

② Bud elongation culture: remove dead buds, cut off the cotyledons, transfer the explants to bud elongation medium, put 5 explants per dish, photoperiod 16/8 hours (light/dark), culture at 25° C., subculture once every 3 weeks, subculture 2 to 4 times.

③ Rooting induction: When the elongated seedlings grow to 3 cm long, cut and transfer to root induction medium, and cultivate under the conditions of photoperiod 16/8 hours (light/dark) at 25° C.

6) Seedling Refining and Transplanting

① When the regenerated plant grows root and grows two or more compound leaves, take out the plant, wash the medium at the root, and plant it in a small flowerpot filled with sterilized vermiculite. The cycle is 16/8 hours, the relative humidity is 85% RH, and the light intensity is 90 μM/m2/s) for 5 to 7 days.

② After the seedlings grow stronger, transplant them into large flowerpots (nutrient soil:vermiculite=1:1), and transfer to the culture room (temperature 28±2° C., photoperiod 13.5/10.5 h, relative humidity 40%-60% RH, light intensity 90 μM/m2/s) to grow to until maturity.

7) Identification of Plants in T1 Generation

Extract DNA from the leaves of the T1 generation transgenic soybean plants, and amplify all the T1 generation plants by PCR and electrophorese using the functional marker GmNNL1$^{HT1}$ gene GmSINE1-F/R. The single plant that can amplify the GmNNL1$^{HT1}$-specific 443 bp band is the successful transgenic plant.

The primers are as follows:

```
GmSINE1-F:
                                        SEQ ID NO. 9
GAAAGTCGTTGGTTTGGCAA;

GmSINE1-R:
                                        SEQ ID NO. 10
CCATGAGCACGTAGCACTGA.
```

Note: The protection of the present invention also includes the functional marker GmSINE1-F/R of GmNNL1$^{HT1}$. GmSINE1-F/R as a functional marker of GmNNL1$^{HT1}$, a fragment of 443 bp can be amplified in the genomic DNA of the line with GmNNL1$^{HT1}$, and a fragment of 622 bp can be amplified in the genome of soybean products with GmNNL1$^{HT2-HT6}$. It can be used for the identification and molecular marker-assisted selection of GmNNL1 haplotypes.

(4) Identification and Phenotype Analysis of GmNNL1HT1 Expression in Transgenic Plants Twenty-five days after inoculation with rhizobia USDA110, inspect the nodule number of transgenic plants, and analyze the gene expression of GmNNL1$^{HT1}$ in nodules by Real Time qRT-PCR method. The primers are as follows:

```
GmNNL1^{HT1}_qF1:
                                        SEQ ID NO. 17
GAATGTAATTCTGCATTGGA;

GmNNL1^{HT1}_qR1:
                                        SEQ ID NO. 18
CACCACAAGTATTGAAGAAACA.
```

Embodiment 4

Figure 7:
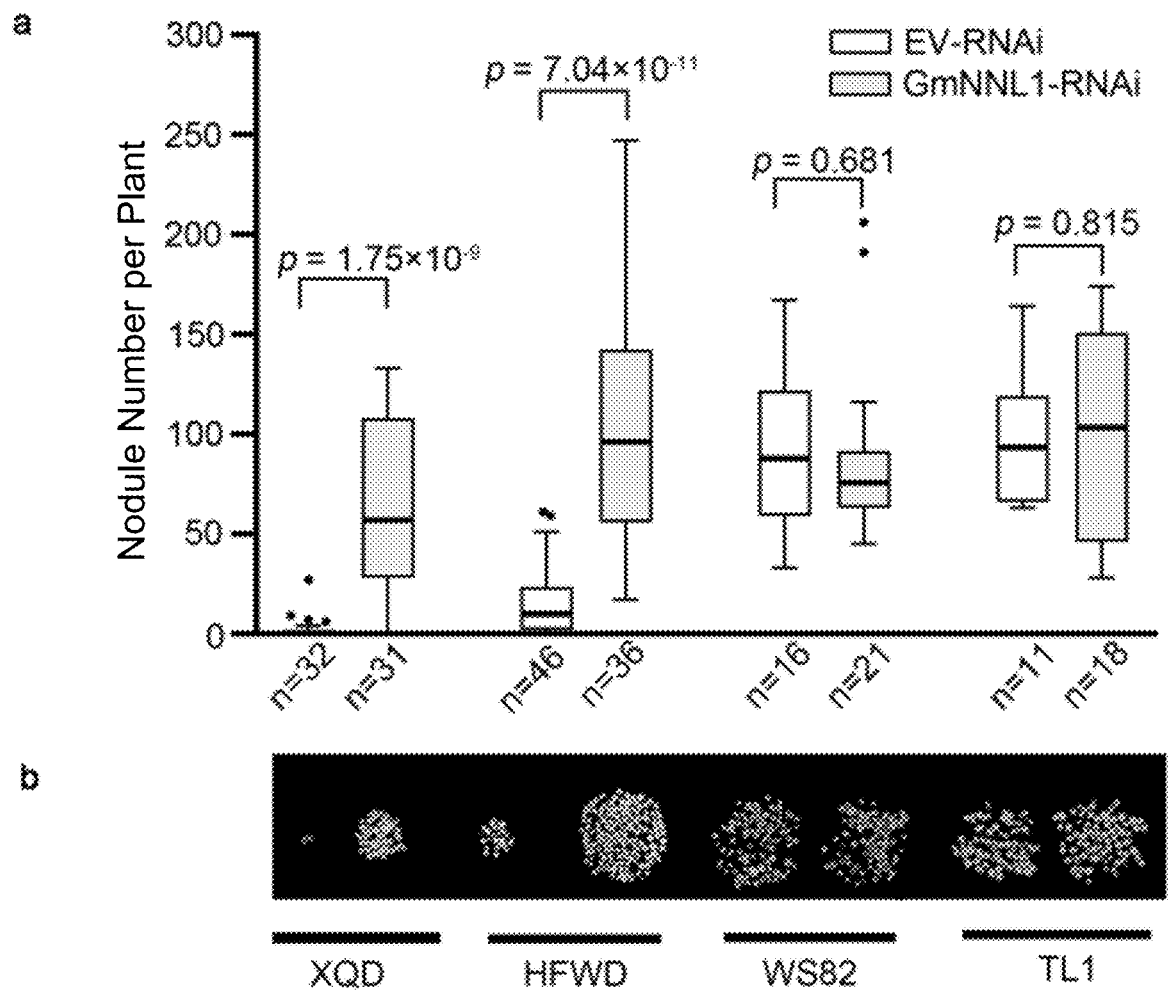
FIG. 7 is a chart illustrating a comparative analysis of the nodule number of hairy roots of RNAi-GmNNL1 transgenic soybean and transgenic soybean with empty vector.
Figure 8:
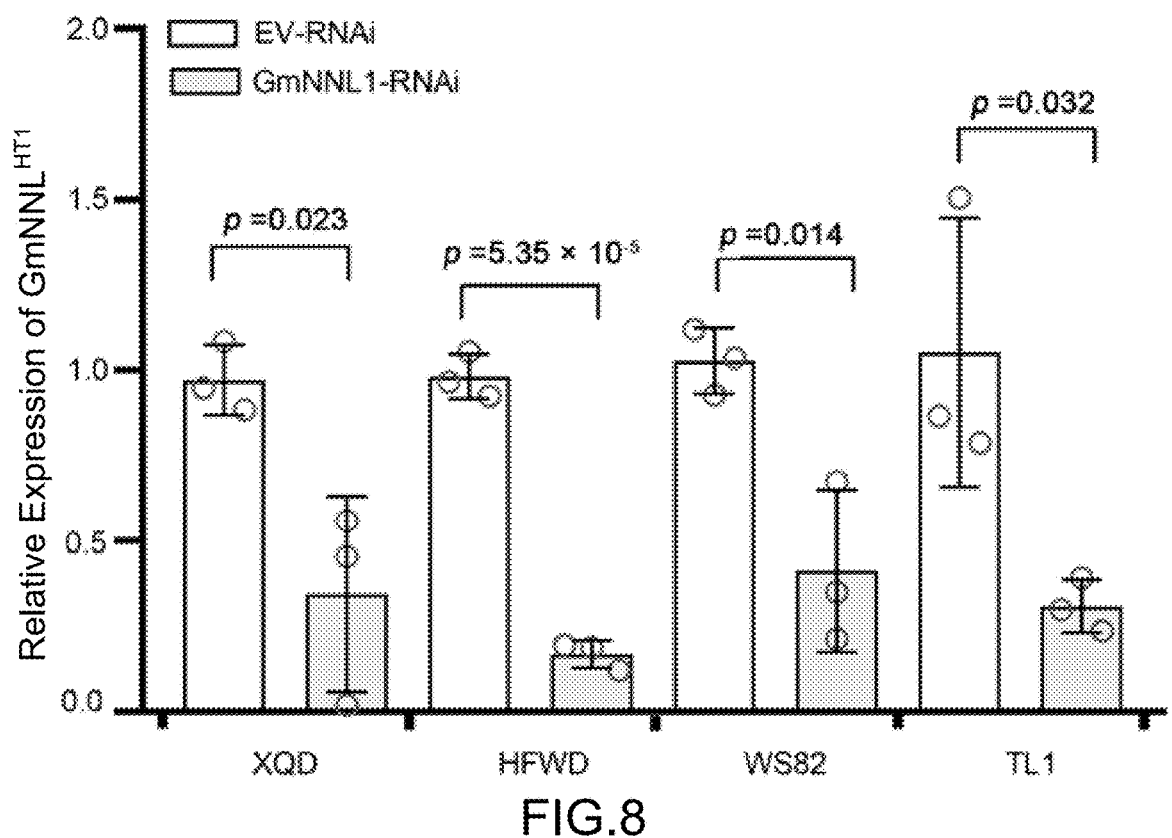
FIG. 8 is a chart illustrating an expression level of GmNNL1 gene in the nodules of RNAi-GmNNL1 transgenic soybean hairy roots.

Construction and application of GmNNL1 gene interference vector: proceed the GmNNL1 gene in Hengfeng black bean of the soybean products (HFWD, GmNNL1$^{HT1}$), small green beans (XQD, GmNNL1$^{HT1}$), Williams82 (WS82, GmNNL1$^{HT2}$) and Tianlong No. 1 (TL1, GmNNL1$^{HT2}$) to RNAi in the hair root transformation system. After the obtained transgenic hair roots are inoculated with USDA110, the expression of GmNNL1$^{HT1}$ decreased, and the nodule number increased in the hair roots of HFWD and XQD. In the hair roots of WS82 and TL1, the nodule number did not change significantly after the expression of GmNNL1$^{HT2}$ is decreased (FIG. 7 and FIG. 8).

(1) Construction of plant expression vector RNAi-GmNNL1: A fragment of 296 bp (+2804-+3099 bp) of GmNNL1 gene is amplified from Hengfeng black beans, and digested using AscI/SwaI and AvrII/BamHI restriction sites, and is connected to RNAi vector pG2RNAi2 to construct pG2RNAi2-GmNNL1 (GmNNL1-RNAi) recombinant vector.

The primers are as follows:

```
2R-RNAi-F:
                                        SEQ ID NO. 19
CGCCTAGGGGCGCGCCAGGAAATGCGGAAGGCTTCA,

2R-RNAi-R:
                                        SEQ ID NO. 20
CGGGATCCATTTAAATCTCTGCTCCCATCCTTGCTT.
```

(2) Transformation of Soybean Hair Roots Mediated by *Agrobacterium rhizogenes* K599

1) Sterilization and Germination of Soybean Seeds

① Seed sterilization: Pick soybeans without damage and spots and sterilize them with chlorine gas (measure 100 ml of sodium hypochlorite into a 250 ml beaker, slowly add 5 ml of concentrated hydrochloric acid along the wall of the beaker, and seal and sterilize for 16 hours).

② Seed germination: Sow the sterilized soybean seeds in sterilized quartz sand, place in a soybean artificial climate chamber for 4 to 5 days, and grow until the cotyledons are erect and are at a right angle to the hypocotyl.

2) Preparation of *Agrobacterium rhizogenes* with the Target Recombinant Vector

Introduce the recombinant plasmid into *Agrobacterium rhizogenes* K599 to obtain engineered bacteria; activate the engineered bacteria in a liquid medium, take 500 μl of engineered bacteria liquid and then culture at 28° C. for about 2 to 3 days to form a "biofilm".

3) Infection

① On the 5th day of germination (that is, after 3 days of dark culture and 2 days of light culture), take out the soybean and cut it along 45° at the "green-white junction" of the hypocotyl.

② Dip the engineering bacteria at soybean hypocotyl incision on the engineering bacteria plate; put the infected soybeans into a nitrogen-free solid medium for co-cultivation for 2 days in the dark.

③ Transfer the plants to square dishes with nitrogen medium, and culture the hypocotyls under the shade for 6 days.

4) Hair Root Culture

Remove the plant, and after removing the roots grown at the cut surface callus, place the plants in a nitrogen-containing liquid medium for 9 to 10 days.

5) Identification and Screening of Transgenic Positive Roots

① Take out the plant, absorb the water on its roots by absorbent paper, and test the positive roots under the asana fluorescence microscope, wherein positive roots are defined with GFP green fluorescence. Only the strongest single positive root is left, and the rest are cut off. The plants with a single positive root are continued to be cultured in nitrogen-containing FM medium for 4 to 5 days, and then transferred to soil for culture and inoculation.

(3) Identification and Phenotype Analysis of GmNNL1 Expression in Hair Roots of Transgenic Plants.

Twenty-five days after inoculation with rhizobia USDA110, inspect the nodule number in the hair roots of the transgenic plants, and analyze the expression of GmNNL1 in the nodules by Real Time qRT-PCR.

The primers are as follows: GmNNL1$^{HT1}$_qF1/qR1 for HFWD and XQD, GmNNL1$^{HT2}$_qF1/qR1 for detection of GmNNL1 gene expression in WS82 and TL1 transgenic hairy roots.

GmNNL1$^{HT1}$_qF1:
SEQ ID NO. 21
GAATGTAATTCTGCATTGGA;

GmNNL1$^{HT1}$_qR1:
SEQ ID NO. 22
CACCACAAGTATTGAAGAAACA;

GmNNL1$^{HT2}$_qF1:
SEQ ID NO. 23
GAGCCCTGGTGCAGCGGTAAAGTTGT;

GmNNL1$^{HT2}$_qR1:
SEQ ID NO. 24
GGCTCTTCGCTATGCGAAGGTATGAGGGA.

Embodiment 5

Figure 9:
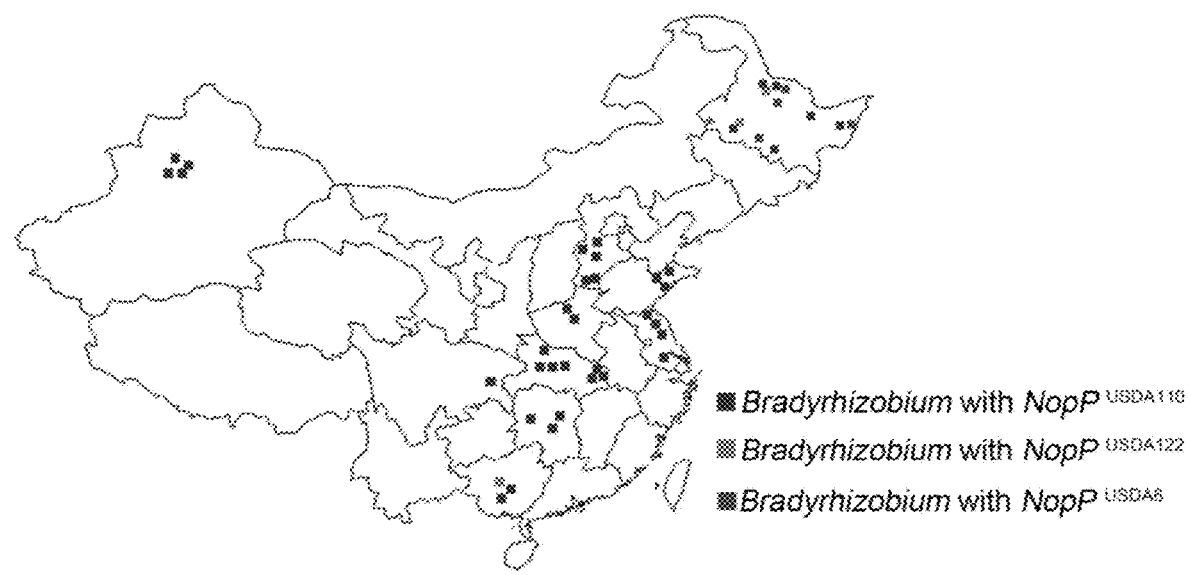
FIG. 9 is a map showing the distribution of bradyrhizobia with different NopP haplotype in our country.

(1) Through the detection of NopP haplotypes of 154 indigenous rhizobia strains in different regions of our country, three NopP haplotypes are mainly identified in our country, wherein 144 strains (93.50% of the total detected rhizobia) have NopP$^{USDA110}$, 5 strains (3.25% of the total detected rhizobia) have NopP$^{USDA6}$ and 5 strains (3.25% of the total detected rhizobia) have NopP$^{USDA122}$, and NopP$^{USDA110}$ is found to be the most widely distributed rhizobia type (FIG. 9).

Figure 10:
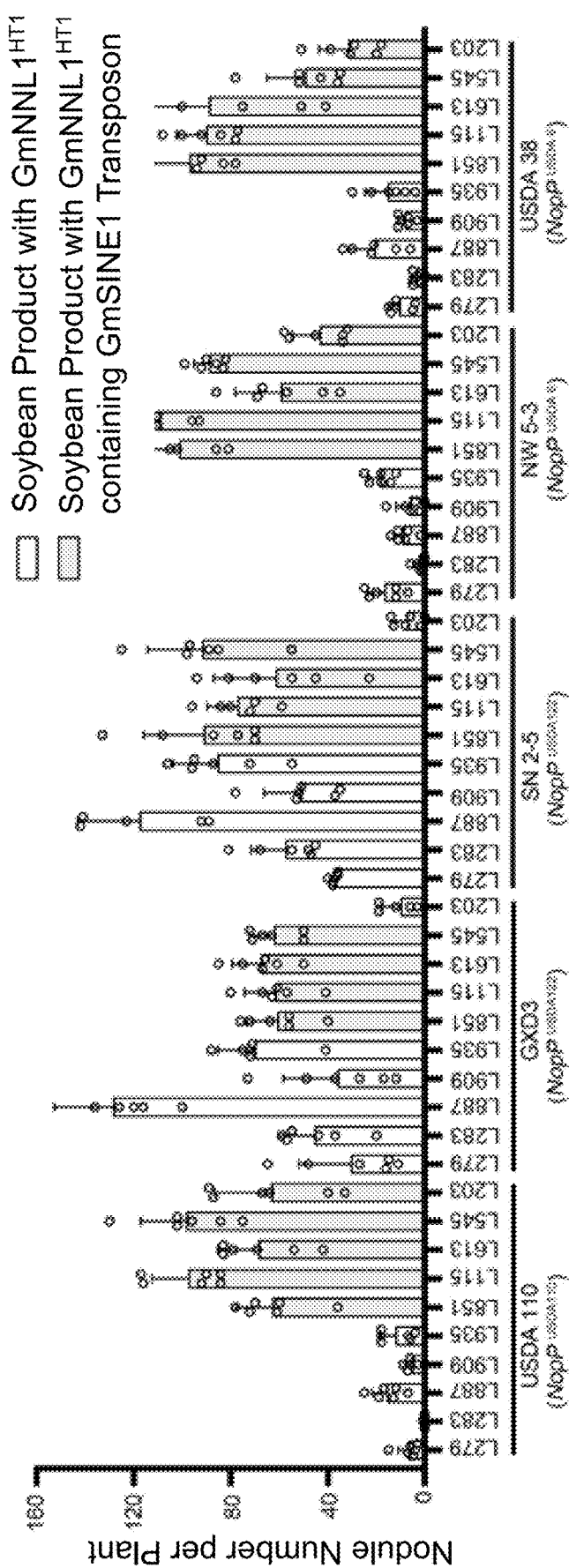
FIG. 10 is a chart illustrating the nodule number of soybeans with different GmNNL1 haplotypes inoculated with bradyrhizobia with different NopP haplotypes.

(2) The nodulation performance of rhizobia inoculated with different NopP haplotypes through soybeans with different GmNNL1 haplotypes is shown in FIG. 10. It is found that soybeans with the GmNNL1HT1 haplotype of the functional R gene could restrict the nodulation of indigenous bradyrhizobia bearing the NopP$^{USDA110}$/USDA6 haplotype on it. However, it cannot limit the nodulation of other rhizobia on it. The GmNNL1$^{HT2-HT6}$ haplotype with a non-functional R gene (the structure of TIR-NBS-LRR is incomplete) is not able to restrict rhizobia nodulation thereon.

Specifically: the choice of soybean material. Ten soybean materials are selected in the present invention, wherein 5 soybean materials have functional GmNNL1$^{HT1}$, which are L279, L283, L887, L909 and L935 respectively; the other 5 soybean materials have non-functional forms of GmSINE1 transposon in GmNNL1, L851, L115, L613, L545 and L203.

Selection of rhizobia materials. Five soybean rhizobia strains are selected in the present invention, which are USDA110(NopP$^{USDA110}$), GXD3(NopP$^{USDA}$122), SN2-5 (NopP$^{USDA122}$), NW5-3(NopP$^{USDA6}$) and USDA38(NopP$^{USDA6}$).

Figure 11:
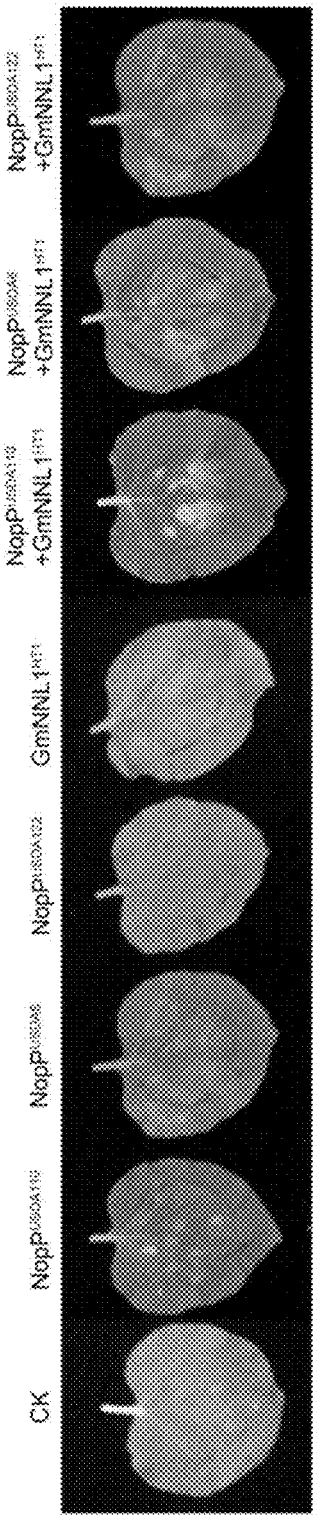
FIG. 11 shows that $GmNNL1^{HT1}$ can recognize Nop-$p^{USDA110/USDA6}$ (but not $NopP^{USDA122}$) to trigger HR response in tobacco leaves.

3) NopP$^{USDA110}$, NopP$^{USDA6}$, NopP$^{USDA122}$, GmNNL1$^{HT1}$, co-transformed GmNNL1$^{HT1}$ and NopP$^{USDA110}$, co-transformed GmNNL1$^{HT1}$ and NopP$^{USDA6}$, and co-transformed GmNNL1$^{HT1}$ and NopP$^{USDA122}$ are injected instantaneously in *N. benthamiana*. After 7 days, it is found that co-transfection of GmNNL1$^{HT1}$ and NopP$^{USDA110}$ and co-transfection of GmNNL1$^{HT1}$ and NopP$^{USDA6}$ could induce strong HR-like cell death in tobacco leaves, while other transfections do not induce strong cell death (FIG. 11). This indicates that GmNNL1$^{HT1}$ can recognize NopP$^{USDA110/USDA6}$ and induce HR response.

The above descriptions are only preferred embodiments of the present invention, and are not intended to be limiting the scope of the present invention. Any modification, equivalent replacement, improvement, etc. made within the spirit and principle of the present invention shall be included within the protection scope of the present invention.

What is claimed is:

1. A method for controlling nodulation to regulate soybean-rhizobium symbiotic compatibility of bradyrhizobia with NopP$^{USDA110/USDA6}$ haplotype, the method comprising:

(a) constructing an overexpression vector comprising the R gene with the sequence shown in SEQ ID NO: 2 and the R gene promoter with the sequence shown in SEQ ID NO:1, or an RNAi vector comprising a fragment of the R gene with the sequence shown in SEQ ID NO: 2 operatively linked to a heterologous promoter;
(b) transforming a soybean plant lacking an endogenous gene comprising SEQ ID NOs: 1 and 2 with the overexpression vector of part (a), or transforming a plant that comprises an endogenous gene comprising SEQ ID NOs: 1 and 2 with the RNAi vector of part (a), through *agrobacterium*-mediated transformation;
(c) selecting any transformed soybean plants from part (b) and screening the transformed soybean plant for the presence of the vector of (a);
(d) selecting the soybean plant comprising the vector of (a) for cultivation;
(e) inoculating the soybean plant of (d) with rhizobia comprising the NopP$^{USDA110/USDA6}$ haplotype; and,
(f) cultivating the soybean plant of (e), whereby the soybean plant comprises an amount of nodulation that is altered compared to a control soybean plant of the same genetic background.

\* \* \* \* \*

SEQUENCE LISTING

<160> NUMBER OF SEQ ID NOS: 24

<210> SEQ ID NO 1
<211> LENGTH: 2017
<212> TYPE: DNA
<213> ORGANISM: Glycine max

<400> SEQUENCE: 1

```
tcgttccctc tcatgtgttc gacgatttga aaaaagaat aagaaggagc atgctaaagg      60
aaaggaaata tgatcctaaa atgtattcat gaaattgata caaaatcaaa ttgcaacaac    120
attaatttat tggaaggaaa tgaaatttgt gaaattgaaa aaaaaaaaat caagtcacat    180
gtgctgaagg aaggagcaac gagatactag taggatagtg gttactagga aattatatat    240
gaaattttac acctaaggac taaatattaa tagaatatga gattatattt ttattggaaa    300
taaaatatat ctagaattaa ttttttttatc ttgtattctc aaaataatt aaatattccg    360
tgaaataaat actcctatct caatttcttt gcctccccat tttttatta taaagtttga    420
gacaaataaa tgaaattgac ataatacact taaatgaaga ctatcattta tttttccaaa    480
accatagaaa ttgaaggaat ggagaggatt tttttccatg aaccgtatgt aaagtttttg    540
cataacgaat gggcgaaaat gagttacgta tatgtttgta tttaatttga gttgagtggt    600
gatgtatcga taacataaaa taattttata tattcattta attataaatt attatttata    660
taacttttaa ataattatca cacatgatac attaatatta tgattggaaa cgatataaat    720
tattttacac tggcagtctg ttttttattt tttattata aataataaga ctccaaaaaa    780
tagtaataat taagctttat attttccaaa ttaagttata gttaaataca aaagaaatca    840
ttaataatta ggctttatat gctccatctt aaaatacaca ataataataa aaaattgcac    900
aaagtaaact aatacagttt tgaaatttaa atgtatgact aattaggttg cgtatgctcg    960
ataacttaaa gctttgattg agttccaaaa aagattatga tttatcttaa agagatcaca   1020
gttgcagcag tacaatttca tacctgaaaa ttcagaggaa tatttgctat tctgattgga   1080
gtaacattct aaaaattact aacaacattg gagaagaaaa cataaaaaaa ttactaacaa   1140
catataaaga aattactagc aacatataaa aatattagat atattagata gggtacaagg   1200
gatactcaac ctttctacag aaaacaaaaa aacctgttct gcaccattcc actgaccaat   1260
taaatctgat aaaccttttc ctataaataa taaacacacc ttagtactcc tacataattc   1320
cttcaaacac tccatgggat acattgacca ttcataaaaa gaaaaggaaa aagacttcat   1380
tctcctatta gaccatcata tccacgatct atacttgatc aaatcagaaa cacattcaaa   1440
gttaggactg tcattattga aaacaatttt atttctatgt aaccatagag tgaccattcg   1500
catatggtct ctttgttttt gctagggagc aaaattattt tctgtaacgt ttccttttgg   1560
cttaagcttt attttttttg gattttatca aggtcgactc ttgatctttg attccaagct   1620
tagttagata taacctcttt gtccgttttg gattgctatt ttatgtcttg tatcttcatg   1680
gattcctctt aaatttctga tgtttcttat atatatacaa gggttagagt attccttta   1740
cttctgattt gaatcccatg ttaataaatt ttttttgcct gcaaaaaaag tcaacaaga   1800
aagtaggaca cttctcacat ttacccccttc tttcgaacca aaagcaatga taagtaaatc   1860
acaaaacaaa taaacaacta acacaaacaa caaccttgca acttcttggt atataaatac   1920
ttgctaattc ctccttactg atcacaaact tgttttactg caaacataag ttgtcttcca   1980
agtttctttg tgtttatatt tctgaagttc ctaaatc                             2017
```

<210> SEQ ID NO 2
<211> LENGTH: 3578
<212> TYPE: DNA
<213> ORGANISM: Glycine max

<400> SEQUENCE: 2

```
atggcacaca gaacagcacc atcttggtct accttcacac ttaaatggat ttatgatgtc     60
```

-continued

```
ttcctcagtt ttagaggtga agacactcgt caaaaattca ctggcaatct ctacaattct    120
ctgtgtgaaa agggagttca tactttcatt gatgatgaag ggcttagaag aggggaagaa    180
attacaccag ctcttctcaa tgccattcaa aattcaagga ttgccattgt tgttttctct    240
aagaactatg catcctcaac ttttttgtttg gatgaacttg tcaagatcct tgagtgcttg    300
aaggaagaaa aaggtcgatc agttttttcca atattttatg atgtggatcc atcacatgtt    360
cggcatcaga aagggactta ttcagaagca ttggcaaaac atgaagaaag gttcccagat    420
gacagtgaca aagtgcaaaa atggaggaag ctttatatg aagcagccaa tctatcaggc    480
tggcatttcc aacatgggta ttctatactt ccttttttatt gtatgtgtta taaactgatc    540 tcttttttaca tttgcctaat aattttcata ttaattactc acaagaaag aaagcatagt    600 aaatcacatt gatctatctt gaacggtgaa atttaagaaa tggagacaat aaatttatga    660
gattaattct gattgaaatg agtaaactaa acacaaattt gaagctttag tttcaattca    720
catgttttat acaatgggca gggagctaga atataagtcc atccgaaaaa ttgttaaaga    780
ggtctataaa aggattagtt gcattccttt acacattgct gataatccaa ttgggctaga    840
gcatgcagtg ctagaagtga atctctcct tggacatggt tctgatgtca acattatagg    900
aatttatggt attggtggta tcggtaaaac cacaatttct cgtgccgtgt ataacttgat    960
ttgtagtcaa tttgaaggca catgttttct ccctgacatt agagaaaagg caatcaataa    1020
gcaaggtctt gtccaactcc aagaaatgtt actttctgaa gtactcaaga gaaacatat    1080 caaagtgggt gatgttaaca gaggaattcc aataataaaa aggaggcttg aaaaaaagaa    1140
ggttcttctg gttttagatg atgttgacaa attagagcag ttaaaggttc ttgcaggaga    1200
aagtcgttgg tttggcaatg gaagtataat cattatcacc acaagagaca aacacttgct    1260
agcgactcat ggggtggtaa aaatatatga tgttaaacca ttaaatgttg caaggctct    1320 tgaattgttt aactggtgtg cctttaaaaa tcataaagct gatccacttt atgtgaatat    1380
tgctaaccgt gcagtttctt atgcgtgtgg cattccattg gctctggaag tgataggttc    1440
tcatttattt ggaaaaagtt tgaatgaatg taattctgca ttggataaat atgaaagaat    1500
tcctcatgaa aagatccatg aaatacttaa agtaagctat gatggtttgg aagaaaatga    1560
gaagcaaatt ttccttgaca ttgcttgttt cttcaatact tgtggtgtgg gctacgtcac    1620
atcagtgcta cgtgctcatg gttttcatgt aaaagatggt ttgagagtgt tggttgacag    1680
atctctctta aagattgatg cttctggttg tgtgagaatg catgatctaa ttcgagacac    1740
aggcagagaa attgtaaggc aagaatcaac agttgagcct ggcagacgta gtaggttatg    1800
gtttgaagag gacattgttc atgttttgga agaaaatacg gtatgttaga aattacgaac    1860
atctctatgc tatttctttg cttttcattc ctttattaaa ataacaattt tactgaatac    1920
atgataaatt tgggattcct ttcccctgtt atctatttaa ttttttatatg atgatgagat    1980 tgctaatgtg cacatttttg tggctaaatt gtgctttggg catggaaggg aactgataaa    2040
atagaattca taaagcttga agggtacaac aacatacaag tgcaatggaa tggaaaagcc    2100
ttgaaggaga tgaagaacct gaggattttg attattgaaa atacaacctt ttctacaggc    2160
cccgagcatc tgccaaatag tttgagagtg ctagattgga gttgctaccc ttcaccatct    2220
ttgcctgctg atttcaatcc taaacgagtt gagctactcc ttatgcctga agttgccttt    2280
caaatcttcc aaccatacaa tgtatgtatc agtttcgaag ttattatttt taacatgaat    2340
ttctacttta aaaaaaaaaa aaaaacacg cacctcacac acaacttgag tcattgtctt    2400
ttaatttgca gatgtttgaa tcattgtctg tgttaagcat tgaagattgc cagttcttaa    2460
```

-continued

```
cagatctacc aagcctaaga gaagtaccac ttttagcata tttgtgtatt gataattgca    2520
ccaatttggt taaaattgat ggttcaattg gctttcttga taagctccaa ctcttgagtg    2580
ctaaacggtg tagcaagcta aaaattctag caccctgcgt catgttgcca tctcttgaaa    2640
ttttggacct tcgggggtgc acatgtcttg atagcttccc ggaagtattg ggaaagatgg    2700
agaacataaa agaaatatat ttagacgaga cagccataga gacactgcca tgttcaattg    2760
gaaattttgt tgggcttcaa cttttgtccc tgaggaaatg cggaaggctt catcagctac    2820
caggtagtat atgtatattg ccgaaagtta aagtgatttt cggttttggg catgtggtat    2880
atcgattttg ggaagagaac caatatgaac aagagttgag cttagaagtg tctccaaggt    2940
ccatggttgt tgttgatggt gacctggatt ttacatatat tgacatgtat tatccacaca    3000
taagtccaaa taatgtcatc caagtatgca gtcctaatct gctcttgcat catgatttca    3060
ttttgttgtt caaaaagctt gcaagcaagg atgggagcag aggcaggaaa tcgtcaatgc    3120
atttctcgtt tcgaaacaaa ttccccaaga ttgcggtatg ttgttctgta ttgcctagtt    3180
tgaaaattac catgatattg attttgaagt tgggcgtact catcaacggc actaagatat    3240
ttagttcatc atgtaactac ttatttacac aaacatggaa cccaaaactt tggtgtgatc    3300
tagaaagcaa agcagagggg atgttttcag agcaagaatg gaatgaagct gagattttgt    3360
ttgagttggg atacccca ccatgtgctg gattaacaat gtcgctccac aactttgctg    3420
agggacgtct aaattggacc ctatttggtg tctacgagaa gggaaataat aaggaggata    3480
ttaaatttaa agatcccatg tcaaccttt cattctgtaa catgctcatg gaacctccct    3540
cttcattacc tagttgtttg tactatgttg ttaaatga                              3578
```

<210> SEQ ID NO 3
<211> LENGTH: 1011
<212> TYPE: PRT
<213> ORGANISM: Glycine max

<400> SEQUENCE: 3

```
Met Ala His Arg Thr Ala Pro Ser Trp Ser Thr Phe Thr Leu Lys Trp
1               5                   10                  15

Ile Tyr Asp Val Phe Leu Ser Phe Arg Gly Glu Asp Thr Arg Gln Lys
                20                  25                  30

Phe Thr Gly Asn Leu Tyr Asn Ser Leu Cys Glu Lys Gly Val His Thr
            35                  40                  45

Phe Ile Asp Asp Glu Gly Leu Arg Arg Gly Glu Ile Thr Pro Ala
        50                  55                  60

Leu Leu Asn Ala Ile Gln Asn Ser Arg Ile Ala Ile Val Phe Ser
65                  70                  75                  80

Lys Asn Tyr Ala Ser Ser Thr Phe Cys Leu Asp Glu Leu Val Lys Ile
                85                  90                  95

Leu Glu Cys Leu Lys Glu Glu Lys Gly Arg Ser Val Phe Pro Ile Phe
            100                 105                 110

Tyr Asp Val Asp Pro Ser His Val Arg His Gln Lys Gly Thr Tyr Ser
        115                 120                 125

Glu Ala Leu Ala Lys His Glu Glu Arg Phe Pro Asp Asp Ser Asp Lys
    130                 135                 140

Val Gln Lys Trp Arg Lys Ala Leu Tyr Glu Ala Ala Asn Leu Ser Gly
145                 150                 155                 160

Trp His Phe Gln His Gly Glu Leu Glu Tyr Lys Ser Ile Arg Lys Ile
                165                 170                 175
```

```
Val Lys Glu Val Tyr Lys Arg Ile Ser Cys Ile Pro Leu His Ile Ala
            180                 185                 190

Asp Asn Pro Ile Gly Leu Glu His Ala Val Leu Glu Val Lys Ser Leu
            195                 200                 205

Leu Gly His Gly Ser Asp Val Asn Ile Ile Gly Ile Tyr Gly Ile Gly
            210                 215                 220

Gly Ile Gly Lys Thr Thr Ile Ser Arg Ala Val Tyr Asn Leu Ile Cys
225                 230                 235                 240

Ser Gln Phe Glu Gly Thr Cys Phe Leu Pro Asp Ile Arg Glu Lys Ala
                245                 250                 255

Ile Asn Lys Gln Gly Leu Val Gln Leu Gln Glu Met Leu Leu Ser Glu
            260                 265                 270

Val Leu Lys Lys His Ile Lys Val Gly Asp Val Asn Arg Gly Ile
            275                 280                 285

Pro Ile Ile Lys Arg Arg Leu Glu Lys Lys Val Leu Leu Val Leu
            290                 295                 300

Asp Asp Val Asp Lys Leu Glu Gln Leu Lys Val Leu Ala Gly Glu Ser
305                 310                 315                 320

Arg Trp Phe Gly Asn Gly Ser Ile Ile Ile Thr Thr Arg Asp Lys
                325                 330                 335

His Leu Leu Ala Thr His Gly Val Val Lys Ile Tyr Asp Val Lys Pro
            340                 345                 350

Leu Asn Val Ala Lys Ala Leu Glu Leu Phe Asn Trp Cys Ala Phe Lys
            355                 360                 365

Asn His Lys Ala Asp Pro Leu Tyr Val Asn Ile Ala Asn Arg Ala Val
            370                 375                 380

Ser Tyr Ala Cys Gly Ile Pro Leu Ala Leu Glu Val Ile Gly Ser His
385                 390                 395                 400

Leu Phe Gly Lys Ser Leu Asn Glu Cys Asn Ser Ala Leu Asp Lys Tyr
                405                 410                 415

Glu Arg Ile Pro His Glu Lys Ile His Glu Ile Leu Lys Val Ser Tyr
            420                 425                 430

Asp Gly Leu Glu Glu Asn Glu Lys Gln Ile Phe Leu Asp Ile Ala Cys
            435                 440                 445

Phe Phe Asn Thr Cys Gly Val Gly Tyr Val Thr Ser Val Leu Arg Ala
450                 455                 460

His Gly Phe His Val Lys Asp Gly Leu Arg Val Leu Val Asp Arg Ser
465                 470                 475                 480

Leu Leu Lys Ile Asp Ala Ser Gly Cys Val Arg Met His Asp Leu Ile
                485                 490                 495

Arg Asp Thr Gly Arg Glu Ile Val Arg Gln Glu Ser Thr Val Glu Pro
            500                 505                 510

Gly Arg Arg Ser Arg Leu Trp Phe Glu Glu Asp Ile Val His Val Leu
            515                 520                 525

Glu Glu Asn Thr Gly Thr Asp Lys Ile Glu Phe Ile Lys Leu Glu Gly
            530                 535                 540

Tyr Asn Asn Ile Gln Val Gln Trp Asn Gly Lys Ala Leu Lys Glu Met
545                 550                 555                 560

Lys Asn Leu Arg Ile Leu Ile Ile Glu Asn Thr Thr Phe Ser Thr Gly
                565                 570                 575

Pro Glu His Leu Pro Asn Ser Leu Arg Val Leu Asp Trp Ser Cys Tyr
            580                 585                 590
```

```
Pro Ser Pro Ser Leu Pro Ala Asp Phe Asn Pro Lys Arg Val Glu Leu
        595                 600                 605

Leu Leu Met Pro Glu Ser Cys Leu Gln Ile Phe Gln Pro Tyr Asn Met
        610                 615                 620

Phe Glu Ser Leu Ser Val Leu Ser Ile Glu Asp Cys Gln Phe Leu Thr
625                 630                 635                 640

Asp Leu Pro Ser Leu Arg Glu Val Pro Leu Leu Ala Tyr Leu Cys Ile
                645                 650                 655

Asp Asn Cys Thr Asn Leu Val Lys Ile Asp Gly Ser Ile Gly Phe Leu
            660                 665                 670

Asp Lys Leu Gln Leu Leu Ser Ala Lys Arg Cys Ser Lys Leu Lys Ile
        675                 680                 685

Leu Ala Pro Cys Val Met Leu Pro Ser Leu Glu Ile Leu Asp Leu Arg
        690                 695                 700

Gly Cys Thr Cys Leu Asp Ser Phe Pro Glu Val Leu Gly Lys Met Glu
705                 710                 715                 720

Asn Ile Lys Glu Ile Tyr Leu Asp Glu Thr Ala Ile Glu Thr Leu Pro
                725                 730                 735

Cys Ser Ile Gly Asn Phe Val Gly Leu Gln Leu Leu Ser Leu Arg Lys
            740                 745                 750

Cys Gly Arg Leu His Gln Leu Pro Gly Ser Ile Cys Ile Leu Pro Lys
        755                 760                 765

Val Lys Val Ile Phe Gly Phe Gly His Val Val Tyr Arg Phe Trp Glu
        770                 775                 780

Glu Asn Gln Tyr Glu Gln Glu Leu Ser Leu Glu Val Ser Pro Arg Ser
785                 790                 795                 800

Met Val Val Asp Gly Asp Leu Asp Phe Thr Tyr Ile Asp Met Tyr
                805                 810                 815

Tyr Pro His Ile Ser Pro Asn Asn Val Ile Gln Val Cys Ser Pro Asn
                820                 825                 830

Leu Leu Leu His His Asp Phe Ile Leu Leu Phe Lys Lys Leu Ala Ser
            835                 840                 845

Lys Asp Gly Ser Arg Gly Arg Lys Ser Ser Met His Phe Ser Phe Arg
        850                 855                 860

Asn Lys Phe Pro Lys Ile Ala Val Cys Cys Ser Val Leu Pro Ser Leu
865                 870                 875                 880

Lys Ile Thr Met Ile Leu Ile Leu Lys Leu Gly Val Leu Ile Asn Gly
                885                 890                 895

Thr Lys Ile Phe Ser Ser Ser Cys Asn Tyr Leu Phe Thr Gln Thr Trp
            900                 905                 910

Asn Pro Lys Leu Trp Cys Asp Leu Glu Ser Lys Ala Glu Gly Met Phe
        915                 920                 925

Ser Glu Gln Glu Trp Asn Glu Ala Glu Ile Leu Phe Glu Leu Gly Tyr
        930                 935                 940

Pro Thr Pro Cys Ala Gly Leu Thr Met Ser Leu His Asn Phe Ala Glu
945                 950                 955                 960

Gly Arg Leu Asn Trp Thr Leu Phe Gly Val Tyr Glu Lys Gly Asn Asn
                965                 970                 975

Lys Glu Asp Ile Lys Phe Lys Asp Pro Met Ser Thr Phe Ser Phe Cys
            980                 985                 990

Asn Met Leu Met Glu Pro Pro Ser  Ser Leu Pro Ser Cys  Leu Tyr Tyr
        995                 1000                1005

Val Val  Lys
```

```
<210> SEQ ID NO 4
<211> LENGTH: 3755
<212> TYPE: DNA
<213> ORGANISM: Glycine max

<400> SEQUENCE: 4
```

| | | | | | |
|---|---|---|---|---|---|
| atggcacaca | gaacagcacc | atcttggtct | accttcacac | ttaaatggat | ttatgatgtc | 60 |
| ttcctcagtt | ttagaggtga | agacactcgt | caaaaattca | ctggcaatct | ctacaattct | 120 |
| ctgtgtgaaa | agggagttca | tactttcatt | gatgatgaag | ggcttagaag | aggggaagaa | 180 |
| attacaccag | ctcttctcaa | tgccattcaa | aattcaagga | ttgccattgt | tgttttctct | 240 |
| aagaactatg | catcctcaac | tttttgtttg | gataaacttg | tcaagatcct | tgagtgcttg | 300 |
| aaggaagaaa | aaggtcgatc | agttttttcca | atattttatg | atgtggatcc | atcacatgtt | 360 |
| cggcatcaga | aagggactta | ttcagaagca | ttggcaaaac | atgaagaaag | gttcccagat | 420 |
| gacagtgaca | aagtgcaaaa | atggaggaag | gctttatatg | aagcagccaa | tctatcaggc | 480 |
| tggcatttcc | aacatgggta | ttctatactt | ccttttttatt | gtatgtgtta | taaactgatc | 540 |
| tcttttttaca | tttgcctaat | aattttcata | ttaattactc | acaagaaag | aaagcatagt | 600 |
| aaatcacatt | gatctatctt | gaacggtgaa | atttaagaaa | tggagacaat | aaatttatga | 660 |
| gattaattct | gattgaaatg | agtaaactaa | acacaaattt | gaagctttag | tttcaattca | 720 |
| catgttttat | acaatgggca | gggagctaga | atataagtcc | atccgaaaaa | ttgttaaaga | 780 |
| ggtctataaa | aggattagtt | gcattccttt | acacattgct | gataatccaa | ttgggctaga | 840 |
| gcatgcagtg | ctagaagtga | aatctctcct | tggacatggt | tctgatgtca | acattatagg | 900 |
| aatttatggt | attggtggta | tcggtaaaac | cacaatttct | cgtgccgtgt | ataacttgat | 960 |
| ttgtagtcaa | tttgaaggca | catgtttttct | ccttgacatt | agagaaaagg | caatcaataa | 1020 |
| gcaaggtctt | gtccaactcc | aagaaatgtt | actttctgaa | gtactcaaga | gaaacatat | 1080 |
| caaagtgggt | gatgttaaca | gaggaattcc | aataataaaa | aggaggcttg | aaaaaagaa | 1140 |
| ggttcttctg | gttttagatg | atgttgacaa | attagagcag | ttaaaggttc | ttgcaggaga | 1200 |
| aagtcgttgg | tttggcaatg | gaagtataat | cattatcacc | acaagagaca | aacacttgct | 1260 |
| agcgactcat | ggggtggtaa | aaatatatga | tgttaaacca | ttaaatgttg | caaaggctct | 1320 |
| tgaattgttt | aactggtgtg | cctttaaaaa | tcataaagct | gatccacttt | atgtgaatat | 1380 |
| tgctaaccgt | gcagtttctt | atgcgtgtgg | cattccattg | gctctggaag | tgataggttc | 1440 |
| tcatttattt | ggaaaaagtt | tgaatgaatg | taattctgca | ttggagggcg | agccctggtg | 1500 |
| cagcggtaaa | gttgtgcctt | ggtgacttgt | tggtcatggg | ttcgaatccg | gaaacagcct | 1560 |
| ctttgcatat | gcaagggtaa | gactgcgtac | aatatccctc | cctcataccct | tcgcatagcg | 1620 |
| aagagcctct | gggcaatggg | gtacgaatgt | aattctgcat | tggataaata | tgaaagaatt | 1680 |
| cctcatgaaa | agatccatga | aatacttaaa | gtaagctatg | atggtttgga | agaaaatgag | 1740 |
| aagcaaattt | tccttgacat | tgcttgtttc | ttcaatactt | gtggtgtggg | ctacgtcaca | 1800 |
| tcagtgctac | gtgctcatgg | ttttcatgta | aagatggtt | tgagagtgtt | ggttgacaga | 1860 |
| tctctcttaa | agattgatgc | ttctggttgt | gtgagaatgc | atgatctaat | tcgagacaca | 1920 |
| ggcagagaaa | ttgtaaggca | agaatcaaca | gttgagcctg | gcagacgtag | taggttatgg | 1980 |
| tttgaagagg | acattgttca | tgttttggaa | gaaaatacgg | tatgttagaa | attacgaaca | 2040 |
| tctctatgct | atttctttgc | ttttcattcc | tttattaaaa | taacaatttt | actgaataca | 2100 |

```
tgataatttt tgggattctt tcccctgtta tctatttaat ttttatatga tgatgagatt      2160
gctaatgtgc acatttttgt ggctaaattg tgctttgggc atggaaggga actgataaaa      2220
tagaattcat aaagcttgaa gggtacaaca acatacaagt gcaatggaat ggaaaagcct      2280
tgaaggagat gaagaacctg aggattttga ttattgaaaa tacaaccttt tctacaggcc      2340
ccgagcatct gccaaatagt ttgagagtgc tagattggag ttgctaccct tcaccatctt      2400
tgcctgctga tttcaatcct aaacgagttg agctactcct tatgcctgaa agttgccttc      2460
aaatcttcca accatacaat gtatgtatca gtttcgaagt tattattttt aacatgaatt      2520
tctactttaa aaaaaaaaaa aaacacgcac ctcacacaca acttgagtca ttgtctttta      2580
atttgcagat gtttgaatca ttgtctgtgt taagcattga agattgccag ttcttaacag      2640
atctaccaag cctacgagaa gtaccacttt tagcatattt gtgtattgat aattgcacca      2700
atttggttaa aattgatggt tcaattggct tcttgataa gctccaactc ttgagtgcta       2760
aacggtgtag caagctaaaa attctagcac cctgcgtcat gttgccatct cttgaaatttt     2820
tggaccttcg ggggtgcaca tgtcttgata gcttcccgga agtattggga agatggaga       2880
acataaaaga aatatattta gacgagacag ccatagagac actgccatgt tcaattggaa      2940
attttgttgg gcttcaactt ttgtccctga ggaaatgcgg aaggcttcat cagctaccag      3000
gtagtatatg tatattgccg aaagttaaag tgattttcgg ttttgggcat gtggtatatc      3060
gattttggga agagaaccaa tatgaacaag agttgagctt agaagtgtct ccaaggtcca      3120
tggttgttgt tgatggtgac ctggatttta catatattga catgtattat ccacacataa      3180
gtccaaataa tgtcatccaa gtatgcagtc ctaatctgct cttgcatcat gatttcattt      3240
tgttgttcaa aaagcttgca agcaaggatg ggagcagatg caggaaatcg tcaatgcatt      3300
tctcgtttcg aaacaaattc cccaagattg cggtatgttg ttctgtattg cctagtttga      3360
aaattaccat gatattgatt ttgaagttgg gcgtactcat caacggcact aagatattta      3420
gttcatcatg taactactta tttacacaaa catggaaccc aaaactttgg tgtgatctag      3480
aaagcaaagc agaggggatg ttttcagagc aagaatggaa tgaagctgag attttgtttg      3540
agttgggata ccccacacca tgtgctggat taacaatgtc gctccacaac tttgctgagg      3600
gacgtctaaa ttggacccta tttggtgtct acgaggaggg aaataataag gaggatatta      3660
aatttaaaga tcccatgtca accttttcat tctgtaacat gctcatgaa cctccctctt       3720
cattacctag ttgtttgtac tatgttgtta aatga                                 3755

<210> SEQ ID NO 5
<211> LENGTH: 3755
<212> TYPE: DNA
<213> ORGANISM: Glycine max

<400> SEQUENCE: 5
atggcacaca gaacagcacc atcttggtct accttcacaa ttaaatggat ttatgatgtc        60
ttcctcagtt ttagaggtga agacactcgt caaaaattca ctggcaatct ctacaattct       120
ctgtgtgaaa agggagttca tactttcatt gatgatgaag gcttagaag aggggaagaa        180
attacaccag ctcttctcaa tgccattcaa aattcaagga ttgccattgt tgttttctct       240
aagaactatg catcctcaac ttttgtttg atgaacttg tcaagatcct tgagtgcttg         300
aaggaagaaa aggtcgatc agttttcca atattttatg atgtggatcc atcacatgtt         360
cggcatcaga aagggactta ttcagaagca ttggcaaaac atgaagaaag gttcccagat        420
```

```
gacagtgaca aagtgcaaaa atggaggaag gctttatatg aagcagccaa tctatcaggc    480
tggcatttcc aacatgggta ttctatactt ccttttatt gtatgtgtta taaactgatc     540 tcttttaca tttgcctaat aattttcata ttaattactc acaaagaaag aaagcatagt     600
aaatcacatt gatctatctt gaacggtgaa atttaagaaa tggagacaat aaatttatga    660
gattaattct gattgaaatg agtaaactaa acacaaattt gaagctttag tttcaattca    720
catgttttat acaatgggca gggagctaga atataagtcc atccgaaaaa ttgttaaaga    780
ggtctataaa aggattagtt gcattccttt acacattgct gataatccaa ttgggctaga    840
gcatgcagtg ctagaagtga aatctctcct tggacatggt tctgatgtca acattatagg    900
aatttatggt attggtggta tcggtaaaac cacaatttct cgtgccgtgt ataacttgat    960
ttgtagtcaa tttgaaggca catgttttct ccctgacatt agagaaaagg caatcaataa   1020
gcaaggtctt gtccaactcc aagaaatgtt actttctgaa gtactcaaga gaaacatat   1080 caaagtgggt gatgttaaca gaggaattcc aataataaaa aggaggcttg aaaaaaagaa   1140
ggttcttctg gttttagatg atgttgacaa attagagcag ttaaaggttc ttgcaggaga   1200
aagtcgttgg tttggcaatg aagtataat cattatcacc acaagagaca aacacttgct    1260
agcgactcat ggggtggtaa aaatatatga tgttaaacca ttaaatgttg caaggctct    1320 tgaattgttt aactggtgtg cctttaaaaa tcataaagct gatccacttt atgtgaatat   1380
tgctaaccgt gcagttttctt atgcgtgtgg cattccattg gctctggaag tgataggttc   1440
tcatttattt ggaaaaagtt tgaatgaatg taattctgca ttggagggcg agccctggtg   1500
cagcggtaaa gttgtgtctt ggtgacttgt tggtcatggg ttcgaatccg gaaacagcct   1560
ctttgcatat gcaagggtaa ggctgcgtac aatatccctc ccccataccct tcgcatagcg   1620 aagagcctct gggcaatggg gtacgaatgt aattctgcat tggataaata tgaaagaatt   1680
cctcatgaaa agatccatga aatacttaaa gtaagctatg atggtttgga agaaaatgag   1740
aagcaaattt tccttgacat tgcttgtttc ttcaatactt gtggtgtggg ctacgtcaca   1800
tcagtgctac gtgctcatgg tttttcatgta aaagatggtt tgagagtgtt ggttgacaga   1860
tctctcttaa agattgatgc ttctggttgt gtgagaatgc atgatctaat tcgacacaca   1920
ggcagagaaa ttgtaaggca agaatcaaca gttgagcctg gcagacgtag taggttatgg   1980
tttgaagagg acattgttca tgtttggaa gaaaatacgg tatgttagaa attacgaaca    2040
tctctatgct atttctttgc ttttcattcc tttattaaaa taacaatttt actgaataca   2100
tgataaattt tgggattctt tcccctgtta tctatttaat ttttatatga tgatgagatt   2160
gctaatgtgc acatttttgt ggctaaattg tgctttgggc atggaaggga actgataaaa   2220
tagaattcat aaagcttgaa gggtacaaca acatacaagt gcaatggaat ggaaaagcct   2280
tgaaggagat gaagaacctg aggatttga ttattgaaaa tacaaccttt tctacaggcc    2340
ccgagcatct gccaaatagt ttgagagtgc tagattggag ttgctaccct tcaccatctt   2400
tgcctgctga tttcaatcct aaacgagttg agctactcct tatgcctgaa agttgccttc   2460
aaatcttcca accatacaat gtatgtatca gtttcgaagt tattatttt aacatgaatt    2520 tctacttaaa aaaaaaaaa aaacacgcac ctcacacaca acttgagtca ttgtctttta   2580
atttgcagat gtttgaatca ttgtctgtgt taagcattga agattgccag ttcttaacag   2640
atctaccaag cctacgagaa gtaccacttt tagcatattt gtgtattgat aattgcacca   2700
atttggttaa aattgatggt tcaattggct ttccttgataa gctccaactc ttgagtgcta   2760
aacggtgtag caagctaaaa attctagcac cctgcgtcat gttgccatct cttgaaattt   2820
```

```
tggaccttcg ggggtgcaca tgtcttgata gcttcccgga agtattggga aagatggaga    2880
acataaaaga aatatattta gacgagacag ccatagagac actgccatgt tcaattggaa    2940
attttgttgg gcttcaactt ttgtccctga ggaaatgcgg aaggcttcat cagctaccag    3000
gtagtatatg tatattgccg aaagttaaag tgattttcgg ttttgggcat gtggtatatc    3060
gattttggga agagaaccaa tatgaacaag agttgagctt agaagtgtct ccaaggtcca    3120
tggttgttgt tgatggtgac ctggatttta catatattga catgtattat ccacacataa    3180
gtccaaataa tgtcatccaa gtatgcagtc ctaatctgct cttgcatcat gatttcattt    3240
tgttgttcaa aaagcttgca agcaaggatg ggagcagatg caggaaatcg tcaatgcatt    3300
tctcgtttcg aaacaaattc cccaagattg cggtatgttg ttctgtattg cctagtttga    3360
aaattaccat gatattgatt ttgaagttgg gcgtactcat caacggcact aagatattta    3420
gttcatcatg taactactta tttacacaaa catggaaccc aaaactttgg tgtgatctag    3480
aaagcaaagc agaggggatg ttttcagagc aagaatggaa tgaagctgag attttgtttg    3540
agttgggata ccccacacca tgtgctggat taacaatgtc gctccacaac tttgctgagg    3600
gacgtctaaa ttggacccta ttcggtgtct acgaggaggg aaataataag gaggatatta    3660
aatttaaaga tcccatgtca accttttcat tctgtaacat gctcatggaa cctccctctt    3720
cattacctag ttgtttgtac tatgttgtta aatga                              3755

<210> SEQ ID NO 6
<211> LENGTH: 3756
<212> TYPE: DNA
<213> ORGANISM: Glycine max

<400> SEQUENCE: 6
atggcacaca gaacagcacc atcttggtct accttcacac ttaaatggat ttatgatgtc      60
ttcctcagtt ttagaggtga agacactcgt caaaaattca ctggcaatct ctacaattct     120
ctgtgtgaaa agggagttca tactttcatt gatgatgaag ggcttagaag aggggaagaa     180
attacaccag ctcttctcaa tgccattcaa aattcaagga ttgccattgt tgttttctct     240
aagaactatg catcctcaac tttttgtttg gatgaacttg tcaagatcct tgagtgcttg     300
aaggaagaaa aaggtcgatc agttttttcca atatttatg atgtggatcc atcacatgtt     360
cggcatcaga aagggactta ttcagaagca ttggcaaaac atgaagaaag gttcccagat     420
gacagtgaca aagtgcaaaa atggaggaag gctttatatg aagcagccaa tctatcaggc     480
tggcatttcc aacatgggta ttctatactt cctttttatt gtatgtgtta taaactgatc     540 tcttttttaca tttgcctaat aatttttcata ttaattactc acaaagaaag aaagcatagt     600
aaatcacatt gatctatctt gaacggtgaa atttaagaaa tggagacaat aaatttatga     660
gattaattct gattgaaatg agtaaactaa acacaaattt gaagctttag tttcaattca     720
catgttttat acaatgggca gggagctaga atataagtcc atccgaaaat ttgttaaaga     780
ggtctataaa aggattagtt gcattccttt acacattgct gataatccaa ttgggctaga     840
gcatgcagtg ctagaagtga aatctctcct tggacatggt tctgatgtca acattatagg     900
aatttatggt attggtggta tcggtaaaac cacaattttct cgtgccgtgt ataacttgat     960
ttgtagtcaa tttgaaggca catgtttttct ccctgacatt agagaaaagg caatcaataa    1020
gcaaggtctt gtccaactcc aagaaatgtt actttctgaa gtactcaaga gaaacatat    1080 caaagtgggt gatgttaaca gaggaattcc aataataaaa aggaggcttg aaaaaaagaa    1140
```

```
ggttcttctg gttttagatg atgttgacaa attagagcag ttaaaggttc ttgcaggaga    1200
aagtcgttgg tttggcaatg gaagtataat cattatcacc acaagagaca aacacttgct    1260
agcgactcat ggggtggtaa aaatatatga tgttaaacca ttaaatgttg caaaggctct    1320
tgaattgttt aactggtgtg cctttaaaaa tcataaagct gatccacttt atgtgaatat    1380
tgctaaccgt gcagtttctt atgcgtgtgg cattccattg gctctggaag tgataggttc    1440
tcatttattt ggaaaaagtt tgaatgaatg taattctgta ttggagggcg agccctggtg    1500
cagcggtaaa gttgtgcctt ggtgacttgt tggtcatggg ttcgaatccg gaaacagcct    1560
ctttgcatat gcaagggtaa ggctgcgtac aatatccctc cctcatacct tcgcatagcg    1620
aagagcctct aggcaatggg gtacgaatgt aattctgcat tggataaata tgaaagaatt    1680
cctcatgaaa agatccatga aatacttaaa gtaagctatg atggtttgga agaaaatgag    1740
aagcaaattt tccttgacat tgcttgtttc ttcaatactt gtggtgtggg ctacgtcaca    1800
tcagtgctac gtgctcatgg ttttcatgta aaagatggtt tgagagtgtt ggttgacaga    1860
tctctcttaa agattgatgc ttctggttgt gtgagaatgc atgatctaat tcgagacaca    1920
ggcagagaaa ttgtaaggca agaatcaaca gttgagcctg cagacgtag taggttatgg     1980 tttgaagagg acattgttca tgttttggaa gaaaatacgg tatgttagaa attacgaaca    2040
tctctatgct atttctttgc ttttcattcc tttattaaaa taacaatttt actgaataca    2100
tgataaattt tgggattctt tcccctgtta tctatttaat ttttatatga tgatgagatt    2160
gctaatgtgc acattttgt ggctaaattg tgctttgggc atggaaggga actgataaaa     2220
tagaattcat aaaagcttgaa gggtacaaca acatacaagt gcaatggaat ggaaaaacct   2280
tgaaggagat gaagaacctg aggatttga ttattgaaaa tacaacctttt tctacaggcc    2340 ccgagcatct gccaaatagt ttgagagtgc tagattggag ttgctaccct tcaccatctt    2400
tgcctgctga tttcaatcct aaacgagttg agctactcct tatgcctgaa agttgccttc    2460
aaatcttcca accatacaat gtatgtatca gtttcgaagt tattatttt aacatgaatt     2520 tctactttaa aaaaaaaaa aaaacacgca cctcacacac aacttgagtc attgtctttt     2580
aatttgcaga tgtttgaatc attgtctgtg ttaagcattg aagattgcca gttcttaaca    2640
gatctaccaa gcctaagaga agtaccactt ttagcatatt tgtgtattga taattgcacc    2700
aatttggtta aaattgaagg ttcaattggc tttcttgata agctccaact cttgagtgct    2760
aaacggtgta gcaagctaaa aattctagca ccctgcgtca tgttgccatc tcttgaaatt    2820
ttggaccttc gggggtgcac atgtcttgat agcttcccgg aagtattggg aaagatggag    2880
aacataaaag aaatatattt agacgagaca gccatagaga cactgccatg ttcaattgga    2940
aattttgttg ggcttcaact tttgtccctg aggaaatgcg gaaggcttca tcagctacca    3000
ggtagtatat gtatattgcc gaaagttaaa gtgattttcg gttttgggca tgtggtatat    3060
cgattttggg aagagaacca atatgaacaa gagttgagct tagaagtgtc tccaaggtcc    3120
atggttgttg ttgatggtga cctggatttt acatatattg acatgtatta tccacacata    3180
agtccaaata atgtcatcca agtatgcagt cctaatctgc tcttgcatca tgatttcatt    3240
ttgttgttca aaaagcttgc aagcaaggat gggagcagag caggaaatc gtcaatgcat     3300 ttctcgtttc gaaacaaatt ccccaagatt gcggtatgtt gttctgtatt gcctagtttg    3360
aaaattacca tgatattgat tttgaagttg ggcgtactca tcaacggcac taagatattt    3420
agttcatcat gtagctactt attacacaa acatggaacc caaaactttg gtgtgatcta     3480
gaaagcaaag cagaggggat gttttcagag caagaatgga atgaagctga gattttgttt    3540
```

| | |
|---|---|
| gagttgggat accccacacc atgtgctgga ttaacaatgt cgctccacaa ctttgctgag | 3600 |
| ggacgtctaa attggaccct atttggtgtc tacgaggagg gaaataataa ggaggatatt | 3660 |
| aaatttaaag atcccatgtc aaccttttca ttctgtaaca tgctcatgga acctccctct | 3720 |
| tcattaccta gttgtttgta ctatgttgtt aaatga | 3756 |

<210> SEQ ID NO 7
<211> LENGTH: 3756
<212> TYPE: DNA
<213> ORGANISM: Glycine max

<400> SEQUENCE: 7

| | |
|---|---|
| atggcacaca gaacagcacc atcttggtct accttcacac ttaaatggat ttatgatgtc | 60 |
| ttcctcagtt ttagaggtga agacactcgt caaaaattca ctggcaatct ctacaattct | 120 |
| ctgtgtgaaa agggagttca tactttcatt gatgatgaag ggcttagaag aggggaagaa | 180 |
| attacaccag ctcttctcaa tgccattcaa aattcaagga ttgccattgt tgttttctct | 240 |
| aagaactatg catcctcaac ttttttgtttg gatgaacttg tcaagatcct tgagtgcttg | 300 |
| aaggaagaaa aggtcgatc agttttttcca atattttatg atgtggatcc atcacatgtt | 360 |
| cggcatcaga aagggactta ttcagaagca ttggcaaaac atgaagaaag gttcccagat | 420 |
| gacagtgaca aagtgcaaaa atggaggaag gctttatatg aagcagccaa tctatcaggc | 480 |
| tggcatttcc aacatgggta ttctatactt ccttttttatt gtatgtgtta taaactgatc | 540 |
| tcttttttaca tttgcctaat aattttcata ttaattactc acaaagaaag aaagcatagt | 600 |
| aaatcacatt gatctatctt gaacggtgaa atttaagaaa tggagacaat aaatttatga | 660 |
| gattaattct gattgaaatg agtaaactaa acacaaattt gaagctttag tttcaattca | 720 |
| catgttttat acaatgggca gggagctaga atataagtcc atccgaaaaa ttgttaaaga | 780 |
| ggtctataaa aggattagtt gcattccttt acacattgct gataatccaa ttgggctaga | 840 |
| gcatgcagtg ctagaagtga aatctctcct tggacatggt tctgatgtca acattatagg | 900 |
| aatttatggt attggtggta tcggtaaaac cacaatttct cgtgccgtgt ataacttgat | 960 |
| ttgtagtcaa tttgaaggca catgttttct ccctgacatt agagaaaagg caatcaataa | 1020 |
| gcaaggtctt gtccaactcc aagaaatgtt actttctgaa gtactcaaga gaaacatat | 1080 |
| caaagtgggt gatgttaaca gaggaattcc aataataaaa aggaggcttg aaaaaaagaa | 1140 |
| ggttcttctg gttttagatg atgttgacaa attagagcag ttaaaggttc ttgcaggaga | 1200 |
| aagtcgttgg tttggcaatg gaagtataat cattatcacc acaagagaca aacacttgct | 1260 |
| agcgactcat ggggtggtaa aaatatatga tgttaaacca ttaaatgttg caaaggctct | 1320 |
| tgaattgttt aactggtgtg cctttaaaaa tcataaagct gatccacttt atgtgaatat | 1380 |
| tgctaaccgt gcagtttctt atgcgtgtgg cattccattg gctctggaag tgataggttc | 1440 |
| tcatttattt ggaaaaagtt tgaatgaatg taattatgta ttggagggcg agccctggtg | 1500 |
| cagcggtaaa gttgtgcctt ggtgacttgt tggtcatggg ttcgaatccg gaaacagcct | 1560 |
| ctttgcatat gcaagggtaa ggctgcgtac aatatccctc ccccataccct tcgcatagcg | 1620 |
| aagagcctct aggcaatggg gtgcgaatgt aattctgcat tggataaata tgaagaatt | 1680 |
| cctcatgaaa agatccatga aatacttaaa gtaagctatg atggtttgga agaaaatgag | 1740 |
| aagcaaattt ccttgacat tgcttgtttc ttcaatactt gtggtgtggg ctacgtcaca | 1800 |
| tcagtgctac gtgctcatgg ttttcatgta aaagatggtt tgagagtgtt ggttgacaga | 1860 |

| | |
|---|---|
| tctctcttaa agattgatgc ttctggttgt gtgagaatgc atgatctaat tcgagacaca | 1920 |
| ggcagagaaa ttgtaaggca agaatcaaca gttgagcctg cagacgtag taggttatgg | 1980 |
| tttgaagagg acattgttca tgttttggaa gaaaatacgg tatgttagaa attacgaaca | 2040 |
| tctctatgct atttctttgc ttttcattcc tttattaaaa taacaatttt actgaataca | 2100 |
| tgataaattt tgggattctt tcccctgtta tctatttaat ttttatatga tgatgagatt | 2160 |
| gctaatgtgc acattttgt ggctaaattg tgctttgggc atggaaggga actgataaaa | 2220 |
| tagaattcat aaagcttgaa gggtacaaca acatacaagt gcaatggaat ggaaaaacct | 2280 |
| tgaaggagat gaagaacctg aggattttga ttattgaaaa tacaaccttt tctacaggcc | 2340 |
| ccgagcatct gccaaatagt ttgagagtgc tagattggag ttgctaccct tcaccatctt | 2400 |
| tgcctgctga tttcaatcct aaacgagttg agctactcct tatgcctgaa agttgccttc | 2460 |
| aaatcttcca accatacaat gtatgtatca gtttcgaagt tattattttt aacatgaatt | 2520 |
| tctactttaa aaaaaaaaaa aaaacacgca cctcacacac aacttgagtc attgtctttt | 2580 |
| aatttgcaga tgtttgaatc attgtctgtg ttaagcattg aagattgcca gttcttaaca | 2640 |
| gatctaccaa gcctaagaga agtaccactt ttagcatatt tgtgtattga taattgcacc | 2700 |
| aatttggtta aaattgaagg ttcaattggc tttcttgata agctccaact cttgagtgct | 2760 |
| aaacggtgta gcaagctaaa aattctagca ccctgcgtca tgttgccatc tcttgaaatt | 2820 |
| ttggaccttc gggggtgcac atgtcttgat agcttcccgg aagtattggg aaagatggag | 2880 |
| aacataaaag aaatatattt agacgagaca gccatagaga cactgccatg ttcaattgga | 2940 |
| aattttgttg ggcttcaact tttgtccctg aggaaatgcg gaaggcttca tcagctacca | 3000 |
| ggtagtatat gtatattgcc gaaagttaaa gtgattttcg gttttgggca tgtggtatat | 3060 |
| cgattttggg aagagaacca atatgaacaa gagttgagct tagaagtgtc tccaaggtcc | 3120 |
| atggttgttg ttgatggtga cctggatttt acatatattg acatgtatta tccacacata | 3180 |
| agtccaaata atgtcatcca agtatgcagt cctaatctgc tcttgcatca tgatttcatt | 3240 |
| ttgttgttca aaaagcttgc aagcaaggat gggagcagat gcaggaaatc gtcaatgcat | 3300 |
| ttctcgtttc gaaacaaatt ccccaagatt gcggtatgtt gttctgtatt gcctagtttt | 3360 |
| aaaattacca tgatattgat tttgaagttg ggcgtactca tcaacggcac taagatattt | 3420 |
| agttcatcat gtagctactt atttacacaa acatggaacc caaaactttg gtgtgatcta | 3480 |
| gaaagcaaag cagaggggat gttttcagag caagaatgga atgaagctga gattttgttt | 3540 |
| gagttgcgat accccacacc atgtgctgga ttaacaatgt cgctccacaa ctttgctgag | 3600 |
| ggacgtctaa attggaccct atttggtgtc tacgaggagg gaaataataa ggaggatatt | 3660 |
| aaatttaaag atcccatgtc aaccttttca ttctgtaaca tgctcatgga acctccctct | 3720 |
| tcattaccta gttgtttgta ctatgttgtt aaatga | 3756 |

<210> SEQ ID NO 8
<211> LENGTH: 3754
<212> TYPE: DNA
<213> ORGANISM: Glycine max

<400> SEQUENCE: 8

| | |
|---|---|
| atggcacaca gaacagcacc atcttggtct accttcacac ttaaatggat ttatgatgtc | 60 |
| ttcctcagtt ttagaggtga agacactcgt caaaaattca ctggcaatct ctacaattct | 120 |
| ctgtgtgaaa agggagttca tactttcatt gatgatgaag ggcttagaag aggggaagaa | 180 |
| attacaccag ctcttctcaa tgccattcaa aattcaagga ttgccattgt tgttttctct | 240 |

```
aagaactatg catcctcaac tttttgtttg gataaacttg tcaagatcct tgagtgcttg      300
aaggaagaaa aaggtcgatc agttttcca atattttatg atgtggatcc atcacatgtt      360
cggcatcaga aagggactta ttcagaagca ttggcaaaac atgaagaaag gttcccagat     420
gacagtgaca aagtgcaaaa atggaggaag gctttatatg aagcagccaa tctatcaggc    480
tggcatttcc aacatgggta ttctatactt ccttttatt gtatgtgtta taaactgatc     540 tcttttaca tttgcctaat aattttcata ttaattactc acaagaaag aaagcatagt      600 aaatcacatt gatctatctt gaacggtgaa atttaagaaa tggagacaat aaatttatga    660
gattaattct gattgaaatg agtaaactaa acacaaattt gaagctttag tttcaattca    720
catgttttat acaatgggca gggagctaga atataagtcc atccgaaaaa ttgttaaaga    780
ggtctataaa aggattagtt gcattccttt acacattgct gataatccaa ttgggctaga    840
gcatgcagtg ctagaagtga aatctctcct tggacatggt tctgatgtca acattatagg    900
aatttatggt attggtggta tcggtaaaac cacaatttct cgtgccgtgt ataacttgat    960
ttgtagtcaa tttgaaggca catgttttct ccttgacatt agagaaaagg caatcaataa   1020
gcaaggtctt gtccaactcc aagaaatgtt actttctgaa gtactcaaga agaaacatat  1080
caaagtgggt gatgttaaca gaggaattcc aataataaaa aggaggcttg aaaaaaagaa  1140
ggttcttctg gttttagatg atgttgacaa attagagcag ttaaaggttc ttgcaggaga  1200
aagtcgttgg tttggcaatg gaagtataat cattatcacc acaagagaca aacacttgct  1260
agcgactcat ggggtggtaa aatatatgat gttaaaccat aaatgttgc aaaggctctt   1320 gaattgttta actggtgtgc ctttaaaaat cataaagctg atccacttta tgtgaatatt  1380
gctaaccgtg cagtttctta tgcgtgtggc attccattgg ctctggaagt gataggttct  1440
catttatttg gaaaaagttt gaatgaatgt aattctgcat tggagggcga gccctggtgc  1500
agcggtaaag ttgtgccttg gtgacttgtt ggtcatgggt tcgaatccgg aaacagcctc   1560
tttgcatatg caagggtaag actgcgtaca atatccctcc ctcataacctt cgcatagcga  1620 agagcctctg ggcaatgggg tacgaatgta attctgcatt ggataaatat gaagaattc    1680 ctcatgaaaa gatccatgaa atacttaaag taagctatga tggtttggaa gaaaatgaga    1740
agcaaatttt ccttgacatt gcttgttct tcaatacttg tggtgtgggc tacgtcacat   1800
cagtgctacg tgctcatggt tttcatgtaa agatggttt gagagtgttg gttgacagat    1860
ctctcttaaa gattgatgct tctggttgtg tgagaatgca tgatctaatt cgagacacag   1920
gcagagaaat tgtaaggcaa gaatcaacag ttgagcctgg cagacgtagt aggttatggt   1980
ttgaagagga cattgttcat gttttggaag aaaatacggt atgttagaaa ttacgaacat   2040
ctctatgcta tttctttgct tttcattcct ttattaaaat aacaattta ctgaatacat     2100 gataattttt gggattcttt ccctgttat ctatttaatt tttatatgat gatgagattg     2160
ctaatgtgca cattttgtgg ctaaattgt gctttgggca tggaagggaa ctgataaaat     2220
agaattcata aagcttgaag ggtacaacaa catacaagtg caatggaatg gaaaagcctt    2280
gaaggagatg aagaacctga ggattttgat tattgaaaat acaacctttt ctacaggccc    2340
cgagcatctg ccaaatagtt tgagagtgct agattggagt tgctacccct caccatcttt    2400
gcctgctgat ttcaatccta acgagttga gctactcctt atgcctgaaa gttgccttca    2460
aatcttccaa ccatacaatg tatgtatcag tttcgaagtt attattttta acatgaattt    2520
ctactttaaa aaaaaaaaa aacacgcacc tcacacacaa cttgagtcat tgtcttttaa     2580
```

| | | | |
|---|---|---|---|
| tttgcagatg | tttgaatcat tgtctgtgtt aagcattgaa gattgccagt tcttaacaga | 2640 |
| tctaccaagc | ctacgagaag taccactttt agcatatttg tgtattgata attgcaccaa | 2700 |
| tttggttaaa | attgatggtt caattggctt tcttgataag ctccaactct tgagtgctaa | 2760 |
| acggtgtagc | aagctaaaaa ttctagcacc ctgcgtcatg ttgccatctc ttgaaatttt | 2820 |
| ggaccttcgg | gggtgcacat gtcttgatag cttcccggaa gtattgggaa agatggagaa | 2880 |
| cataaaagaa | atatatttag acgagacagc catagagaca ctgccatgtt caattggaaa | 2940 |
| ttttgttggg | cttcaacttt tgtccctgag gaaatgcgga aggcttcatc agctaccagg | 3000 |
| tagtatatgt | atattgccga aagttaaagt gattttcggt tttgggcatg tggtatatcg | 3060 |
| attttgggaa | gagaaccaat atgaacaaga gttgagctta gaagtgtctc caaggtccat | 3120 |
| ggttgttgtt | gatggtgacc tggattttac atatattgac atgtattatc cacacataag | 3180 |
| tccaaataat | gtcatccaag tatgcagtcc taatctgctc ttgcatcatg atttcatttt | 3240 |
| gttgttcaaa | aagcttgcaa gcaaggatgg gagcagatgc aggaaatcgt caatgcattt | 3300 |
| ctcgtttcga | aacaaattcc ccaagattgc ggtatgttgt tctgtattgc ctagtttgaa | 3360 |
| aattaccatg | atattgattt tgaagttggg cgtactcatc aacggcacta agatatttag | 3420 |
| ttcatcatgt | aactacttat ttacacaaac atggaaccca aaactttggt gtgatctaga | 3480 |
| aagcaaagca | gaggggatgt tttcagagca agaatggaat gaagctgaga ttttgtttga | 3540 |
| gttgggatac | cccacaccat gtgctggatt aacaatgtcg ctccacaact ttgctgaggg | 3600 |
| acgtctaaat | tggaccctat ttggtgtcta cgaggaggga aataataagg aggatattaa | 3660 |
| atttaaagat | cccatgtcaa ccttttcatt ctgtaacatg ctcatggaac ctccctcttc | 3720 |
| attacctagt | tgtttgtact atgttgttaa atga | 3754 |

<210> SEQ ID NO 9
<211> LENGTH: 20
<212> TYPE: DNA
<213> ORGANISM: Artificial Sequence
<220> FEATURE:
<223> OTHER INFORMATION: GmSINE1-F sequence

<400> SEQUENCE: 9
gaaagtcgtt ggtttggcaa                                             20

<210> SEQ ID NO 10
<211> LENGTH: 20
<212> TYPE: DNA
<213> ORGANISM: Artificial Sequence
<220> FEATURE:
<223> OTHER INFORMATION: GmSINE1-R sequence

<400> SEQUENCE: 10
ccatgagcac gtagcactga                                             20

<210> SEQ ID NO 11
<211> LENGTH: 24
<212> TYPE: DNA
<213> ORGANISM: Artificial Sequence
<220> FEATURE:
<223> OTHER INFORMATION: NNL1-F

<400> SEQUENCE: 11
atggcacaca gaacagcacc atct                                        24

<210> SEQ ID NO 12
<211> LENGTH: 23

```
<212> TYPE: DNA
<213> ORGANISM: Artificial Sequence
<220> FEATURE:
<223> OTHER INFORMATION: NNL1-R

<400> SEQUENCE: 12
tcatttaaca acatagtaca aac                                              23

<210> SEQ ID NO 13
<211> LENGTH: 22
<212> TYPE: DNA
<213> ORGANISM: Artificial Sequence
<220> FEATURE:
<223> OTHER INFORMATION: pNNL1-F

<400> SEQUENCE: 13
tcgttccctc tcatgtgttc ga                                               22

<210> SEQ ID NO 14
<211> LENGTH: 20
<212> TYPE: DNA
<213> ORGANISM: Artificial Sequence
<220> FEATURE:
<223> OTHER INFORMATION: pNNL1-R

<400> SEQUENCE: 14
gatttaggaa cttcagaaat                                                  20

<210> SEQ ID NO 15
<211> LENGTH: 43
<212> TYPE: DNA
<213> ORGANISM: Artificial Sequence
<220> FEATURE:
<223> OTHER INFORMATION: NNL1-aF

<400> SEQUENCE: 15
cagtgccaag ctgggctgca gtcgttccct ctcatgtgtt cga                        43

<210> SEQ ID NO 16
<211> LENGTH: 45
<212> TYPE: DNA
<213> ORGANISM: Artificial Sequence
<220> FEATURE:
<223> OTHER INFORMATION: NNL1-aR

<400> SEQUENCE: 16
gtccttatag tccatggtac ctttaacaac atagtacaaa caact                      45

<210> SEQ ID NO 17
<211> LENGTH: 20
<212> TYPE: DNA
<213> ORGANISM: Artificial Sequence
<220> FEATURE:
<223> OTHER INFORMATION: GmNNL1HT1_qF1

<400> SEQUENCE: 17
gaatgtaatt ctgcattgga                                                  20

<210> SEQ ID NO 18
<211> LENGTH: 22
<212> TYPE: DNA
<213> ORGANISM: Artificial Sequence
<220> FEATURE:
<223> OTHER INFORMATION: GmNNL1HT1_qR1

<400> SEQUENCE: 18
```

```
caccacaagt attgaagaaa ca                                              22

<210> SEQ ID NO 19
<211> LENGTH: 36
<212> TYPE: DNA
<213> ORGANISM: Artificial Sequence
<220> FEATURE:
<223> OTHER INFORMATION: 2R-RNAi-F

<400> SEQUENCE: 19
cgcctagggg cgcgccagga aatgcggaag gcttca                               36

<210> SEQ ID NO 20
<211> LENGTH: 36
<212> TYPE: DNA
<213> ORGANISM: Artificial Sequence
<220> FEATURE:
<223> OTHER INFORMATION: 2R-RNAi-R

<400> SEQUENCE: 20
cgggatccat ttaaatctct gctcccatcc ttgctt                               36

<210> SEQ ID NO 21
<211> LENGTH: 20
<212> TYPE: DNA
<213> ORGANISM: Artificial Sequence
<220> FEATURE:
<223> OTHER INFORMATION: GmNNL1HT1_qF1

<400> SEQUENCE: 21
gaatgtaatt ctgcattgga                                                 20

<210> SEQ ID NO 22
<211> LENGTH: 22
<212> TYPE: DNA
<213> ORGANISM: Artificial Sequence
<220> FEATURE:
<223> OTHER INFORMATION: GmNNL1HT1_qR1

<400> SEQUENCE: 22
caccacaagt attgaagaaa ca                                              22

<210> SEQ ID NO 23
<211> LENGTH: 26
<212> TYPE: DNA
<213> ORGANISM: Artificial Sequence
<220> FEATURE:
<223> OTHER INFORMATION: GmNNL1HT2_qF1

<400> SEQUENCE: 23
gagccctggt gcagcggtaa agttgt                                          26

<210> SEQ ID NO 24
<211> LENGTH: 29
<212> TYPE: DNA
<213> ORGANISM: Artificial Sequence
<220> FEATURE:
<223> OTHER INFORMATION: GmNNL1HT2_qR1

<400> SEQUENCE: 24
ggctcttcgc tatgcgaagg tatgaggga                                       29
```